US012571710B2

(12) United States Patent
Sun et al.

(10) Patent No.: US 12,571,710 B2
(45) Date of Patent: Mar. 10, 2026

(54) MULTIFUNCTIONAL MICROPILLAR-ENABLED ACOUSTIC WAVE VISCOMETER

(71) Applicant: Northeastern University, Boston, MA (US)

(72) Inventors: Hongwei Sun, Lexington, MA (US); Ilia Chiniforooshan Esfahani, Boston, MA (US)

(73) Assignee: Northeastern University, Boston, MA (US)

( * ) Notice: Subject to any disclaimer, the term of this patent is extended or adjusted under 35 U.S.C. 154(b) by 309 days.

(21) Appl. No.: 18/219,978

(22) Filed: Jul. 10, 2023

(65) Prior Publication Data

US 2024/0011881 A1      Jan. 11, 2024

Related U.S. Application Data

(60) Provisional application No. 63/491,179, filed on Mar. 20, 2023, provisional application No. 63/359,371, filed on Jul. 8, 2022.

(51) Int. Cl.
| | |
|---|---|
| *G01N 11/16* | (2006.01) |
| *G01N 29/036* | (2006.01) |
| *G01N 29/22* | (2006.01) |
| *G01N 11/00* | (2006.01) |

(52) U.S. Cl.
CPC .......... *G01N 11/16* (2013.01); *G01N 29/036* (2013.01); *G01N 29/222* (2013.01); *G01N 2011/0073* (2013.01); *G01N 2291/02818* (2013.01)

(58) Field of Classification Search
None
See application file for complete search history.

(56) References Cited

U.S. PATENT DOCUMENTS

| | | | |
|---|---|---|---|
| 10,268,114 B2 * | 4/2019 | Sun ................... | G01N 29/4472 |
| 2019/0353619 A1 * | 11/2019 | Sun ...................... | G01N 29/036 |

OTHER PUBLICATIONS

Wang, P. et al., "Ultrasensitive Quartz Crystal Microbalance Enabled by Micropillar Structure", Applied Physics Letters, vol. 104, 2014, pp. 043504 (1-4).*
Wang, P. et al., "Detection of Liquid Penetration of a Micropillar Surface Using the Quartz Crystal Microbalance", Langmuir, vol. 3, 2017, pp. 638-644.*
Wang, P. et al., "An Ultrasensitive Quartz Crystal Microbalance-Micropillars Based Sensor for Humidity", Journal of Applied Physics , vol. 115, 2014, pp. 224501 (1-6).*
Ji., S. et al., "Novel Analysis of a Micropillar Coupled Acoustic Wave Sensor", Sensors and Actuators Report, vol. 3, 2021, pp. 100034 (1-6).*

* cited by examiner

*Primary Examiner* — Daniel S Larkin
(74) *Attorney, Agent, or Firm* — Dana M. Gordon; John D. Lanza; Foley Hoag LLP

(57)      ABSTRACT

A micropillar-enabled acoustic wave (μPAW) viscometer including a quartz crystal microbalance (QCM) substrate; at least one micropillar having a first end and a second end, defining a height therebetween, the at least one micropillar disposed on to the QCM substrate at the first end and extending perpendicular to the QCM substrate; and a film disposed between the at least one micropillar and the QCM substrate.

9 Claims, 23 Drawing Sheets

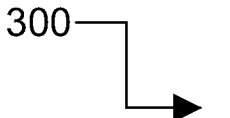
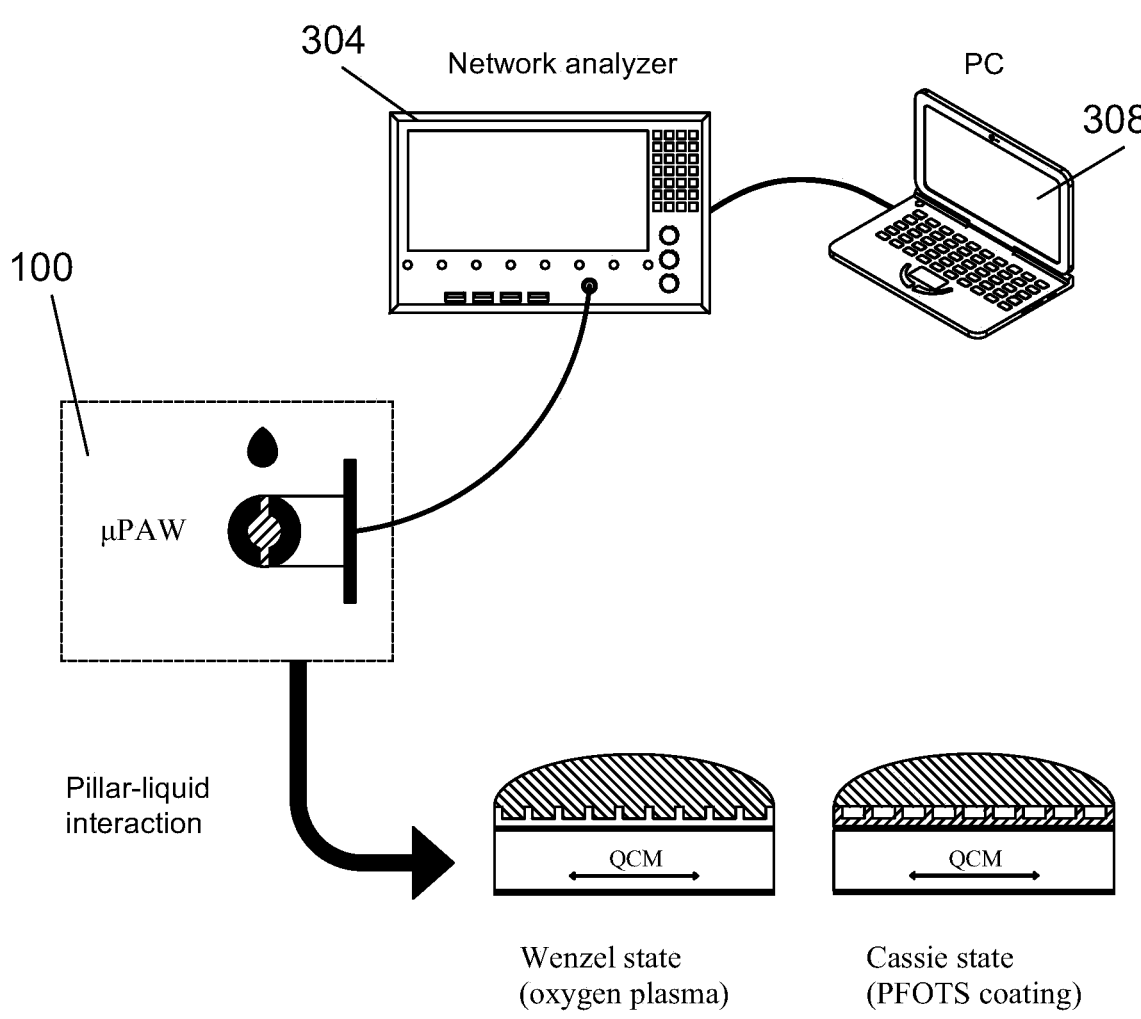
FIG. 3

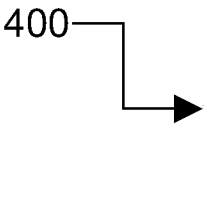
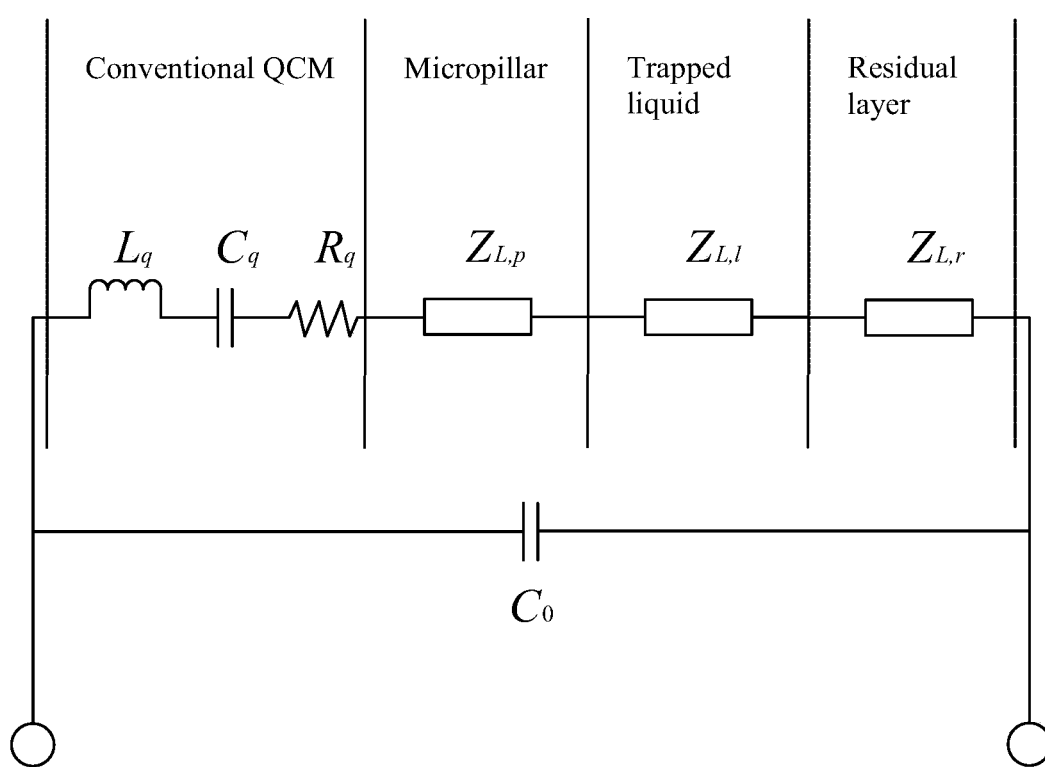
FIG. 4

Hex nut

Cover plate

Flow cell

QCM-P sensors

O-rings

Interface plate

Electronical circuit

Screws

1200

1208     Solution switching

Solution II     Solution I

1100

Data acquisition

Flow cell

1212

Syringe pump

1204

MULTIFUNCTIONAL MICROPILLAR-ENABLED ACOUSTIC WAVE VISCOMETER

CROSS-REFERENCE TO RELATED APPLICATIONS

This application claims the benefit of priority to U.S. Provisional Patent Application No. 63/359,371, filed Jul. 8, 2022; and U.S. Provisional Patent Application No. 63/491,179, filed Mar. 20, 2023.

FIELD OF THE DISCLOSED SUBJECT MATTER

The disclosed subject matter relates to a viscometer. Particularly, the present disclosed subject matter is directed to a multifunctional micropillar-enabled acoustic wave ("μPAW") viscometer.

BACKGROUND OF THE DISCLOSED SUBJECT MATTER

Viscosity is one of the fundamental properties of liquids and gases. Viscosity measurement has recently captured considerable attention due to its wide range of applications in fields, such as pharmacy, food industry, cosmetic industry, and biomedical diagnostics. For example, the viscosity of an injectable drug should be similar to that of blood so it can be easily miscible with the blood in drug delivery. Biomedical diagnostics use viscosity for testing and analyzing biofluids, such as blood, urine, and saliva. Similarly, the food industry applies viscosity to ensure that the flow rate in pipes is sufficient to fill the packets. In addition, it is crucial to develop a device capable of measuring and analyzing viscosity with high precision while requiring a small sample volume (e.g., a microliter or less).

The elementary viscosity measurement relies on pouring a fluid and calculating the time required to empty or fill a vessel. Traditional viscometers are classified into four broad categories: U-tube, falling/rising objects, rotational and vibrational viscometers. U-tube Viscometers include a U-shaped glass tube, where the viscosity is determined by the time required for the fluid to fill the tube. The working principle of the falling ball viscometer is based on Stokes' law, where the viscosity is determined by the time required for the object to fall due to the fluid's resistance. Rotational viscometers measure the viscosity by evaluating the torque required to turn the spindle in the fluid. Vibrational viscometers are the most popular among traditional viscometers due to their high sensitivity and lack of moving parts. Recently, microfluidic channels and devices have been developed as a result of advancements in micro-nanofabrication technologies.

Viscosity measurement has recently captured considerable attention due to its wide range of applications in fields, such as pharmacy, food industry, cosmetic industry, and biomedical diagnostics. Acoustic wave sensors, such as quartz crystal microbalances (QCM) have been widely used as mass sensors and are also capable of measuring liquid viscosity. However, challenges for QCM-based viscosity measurement devices include low sensitivity and unstable response.

There thus remains a need for an efficient and economic method and system for integrated end cap in pultrusion as described herein.

SUMMARY OF THE DISCLOSED SUBJECT MATTER

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes a system for a micropillar-enabled acoustic wave viscometer including a quartz crystal microbalance (QCM) substrate, at least one micropillar having a first end and a second end, defining a height therebetween, the at least one micropillar disposed on to the QCM substrate at the first end and extending perpendicular to the QCM substrate, and a film disposed between the at least one micropillar and the QCM substrate.

The disclosed subject matter also includes a system for a micropillar-enabled acoustic wave viscometer including a flow cell having at least one sensor well disposed within the flow cell a fluid inlet in fluid communication with the at least one sensor well, the fluid inlet configured to deliver fluid into the at least one sensor well, a fluid outlet in fluid communication with the at least one sensor well and the fluid inlet, the fluid outlet configured to deliver fluid out of the at least one sensor well, a cover plate disposed over the flow cell, the cover plate encapsulating the at least one sensor well, at least one μPAW sensor disposed in the at least one sensor well, the at least one μPAW sensor having, a quartz crystal microbalance (QCM) substrate, at least one micropillar having a first end and a second end, defining a height therebetween, the at least one micropillar disposed on to the QCM substrate at the first end and extending perpendicular to the QCM substrate, and a film disposed between the at least one micropillar and the QCM substrate, an interface plate, and a frequency measurement system in electrical communication with the at least one μPAW sensors and the interface plate.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

FIG. 3 is a schematic system diagram of a viscometer in accordance with the disclosed subject matter.

FIG. 4 is a schematic system diagram of a modified Butterworth-van Dyke (BVD) equivalent circuit for a μPAW operating in a liquid medium.

FIG. 10 are SEM images of PMMA micropillars with various heights in accordance with the disclosed subject matter.

FIG. 18 is a plot of sensitivity enhancement of μPAW devices operating in sucrose solutions in accordance with the disclosed subject matter.

FIG. 19 is a schematic representation of a flow cell in accordance with the disclosed subject matter.

FIG. 20B is pictorial representation of a flow cell viscometer in accordance with the disclosed subject matter.

FIG. 23 is a plot of predicted versus measured values of viscometer measurements in accordance with the disclosed subject matter.

DETAILED DESCRIPTION OF EXEMPLARY EMBODIMENTS

Reference will now be made in detail to exemplary embodiments of the disclosed subject matter, an example of which is illustrated in the accompanying drawings. The method and corresponding steps of the disclosed subject matter will be described in conjunction with the detailed description of the system.

Figure 1:
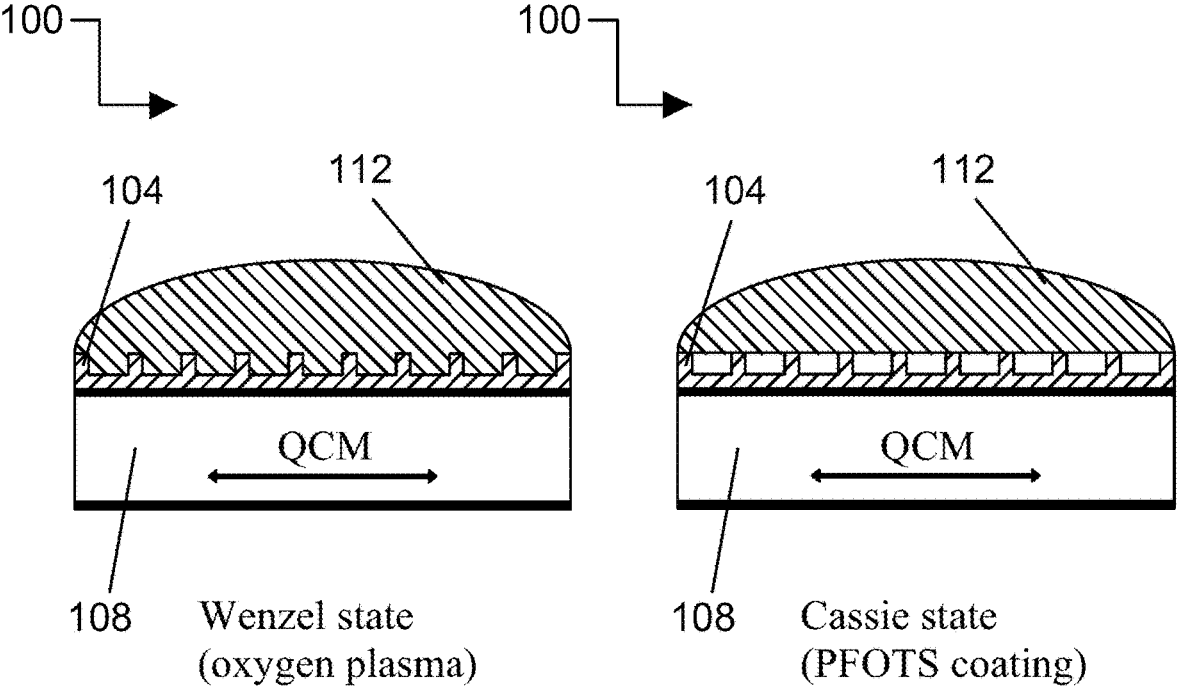
FIGS. 1A and 1B are a schematic representation of the multifunctional micropillar-enabled acoustic wave (μPAW) viscometer in accordance with an aspect of the disclosed subject matter.

The methods and systems presented herein may be used for measuring viscosity of a fluid. The disclosed subject matter is particularly suited for a multipurpose micropillar-enabled viscometer. For purpose of explanation and illustration, and not limitation, an exemplary embodiment of the system in accordance with the disclosed subject matter is shown in FIG. 1 and is designated generally by reference character 100. Similar reference numerals (differentiated by the leading numeral) may be provided among the various views and Figures presented herein to denote functionally corresponding, but not necessarily identical structures.

Drop-On-Micropillar

Referring now to FIGS. 1A-1B, a viscometer 100 is shown in two cross-sectional embodiments. Viscometer 100 includes at least one micropillar 104. Micropillar 104 may be formed from polymethyl methacrylate (PMMA). Micropillar 104 may be an array of micropillars 104 (also referred to with numeral 104). Micropillar array 104 may include pillars with a square cross-section. The micropillar array 104 may be fabricated on a quartz crystal plate surface by thermal nanoimprinting lithography (T-NIL). In various embodiments, at least a portion of the surface of micropillars 104 may be modified through chemical vapor deposition (CVD) to produce a superhydrophobic wetting state. In various embodiments, glycerol solutions with viscosities ranging from 3 cP (30% V/V) to 91.4 cP (80% V/V) may be utilized with the viscometer 100 as described herein. In various embodiments, the micropillars 104 may behave as would follow from the Euler-Bernoulli beam theory to understand the behavior of the drop-on-micropillar (DOM) viscometer and predict the Q-factor of the devices.

In various embodiments, a drop 112 of fluid is suspended over (or over and within) the micropillar array 104. Drop 112 is the target fluid for measurement. In various embodiments, drop 112 may be suspended to overcome the high energy dissipation and further broaden the range of viscosity measurement of the viscometer 100.

Referring specifically to FIG. 1A, a viscometer 100 is depicted as a drop-on-micropillar viscometer in a Wenzel state. Drop 112 can form two stable wetting states on micropillars-Cassie and Wenzel states. While in the Wenzel state, the liquid of drop 112 fills the cavities between micropillars 104, resulting in an entire immersion of micropillars in liquid.

Referring specifically to FIG. 1B, viscometer 100 is depicted as a drop-on-micropillar viscometer in a Cassie state. In the Cassie state, drop 112 sits on the top surface of the micropillars 104, and the air fills in between the micropillars 104. In various embodiments, to produce a Cassie state, the micropillars 104 surfaces were modified to be hydrophobic to produce the Cassie wetting state. As a result, only the tops of the micropillars are in contact with the liquid for the viscosity measurement purpose. In this way, the viscometer 100 can maintain the high sensitivity of the μPAW technology while avoiding the high energy dissipation (damping) caused by the surrounding liquid to micropillars 104 that would occur in a Wenzel state.

In various embodiments, viscometer 100 includes quartz crystal microbalance (QCM) 108. QCM 108 may be micro- and/or nanofabricated, vibration-based viscosity measurement device, such as microcantilever and quartz crystal resonator (QCR). In various embodiments, QCM 108 may be replaced with various crystal resonators, such as Zinc Oxide (ZnO), quartz, and/or lithium niobate that operate in thickness shear mode (TSM). Among different crystal resonators, the AT-cut quartz crystal microbalance (QCM) may be utilized due to its low-cost fabrication, availability, and insensitivity to temperature. The frequency shift of the QCM 108 viscometer in response to the liquid viscosity changes is described by the Kanazawa theory, described as $$\Delta f = -\frac{f_0^{3/2}}{Z_q}\sqrt{\frac{\rho_L \eta_L}{\pi}};$$

where $f_0$ is fundamental quartz resonance frequency, $Z_q$ is quartz acoustic impedance, $\rho_L$ is the medium density and nu is the medium viscosity. It shows that the QCM with impedance analysis method was capable of measuring the blood viscosity with an accuracy of 1.8% for a blood volume of 17.5 μL. Recently, a novel acoustic wave based sensing mechanism was discovered by imprinting polymer micropillars on the acoustic wave substrate to form a μPAW device, leading to a two-degree-of-freedom vibration system. Because of the resonance of micropillars and acoustic wave substrate, the μPAW devices demonstrated a maximum mass sensitivity of 27-fold compared to conventional QCM in detecting bovine serum albumin (BSA) adhesion on the substrate. The μPAW technology has also shown a higher sensitivity in measuring viscosity but suffers from significant energy dissipation or damping, especially for viscous liquids, such as blood.

QCM 108 may be one or more AT-cut quartz crystal resonator of the resonance frequency of 10 MHz. QCM 108 may be 167 μm in thickness with coated 100 nm-thickness gold films on one or both of a top and bottom surfaces. The PMMA micropillars 104 may be directly fabricated on the QCR (QCM 108) substrate using T-NIL, and in various embodiments an NX-2600 nanoimprint tool may be utilized. In various embodiments, the micropillars 104 may be fabricated elsewhere and coupled to QCM 108 after fabrication. In various embodiments, a portion of micropillars 104 may be fabricated directly on QCM 108 and a portion may be coupled thereafter. The nanoimprinted PMMA micropillars 104 may have a square-shaped cross-section with a side length of 10 μm. The PMMA micropillars 104 may have a center-to-center spacing of approximately 21 μm. In various embodiments, adjacent micropillars in the micropillar array may be the same height. In various embodiments, adjacent micropillars may include variable center-center distances. In various embodiments, each micropillar may be randomly dispersed on the substrate. In various embodiments, each micropillar may have a varying height. In various embodiments, each micropillar may have an increasing height relative to an immediately adjacent pillar. For example, and without limitation, each micropillar may be about 6.4 μm, about 10.3 μm, about 11.5 μm, about 13.9 μm, or about 18.1 μm, respectively. In various embodiments, various groupings of micropillars may be various heights on the same substrate, for example about 6.4 μm, about 10.3 μm, about 11.5 μm, about 13.9 μm, or about 18.1 μm. In various embodiments, each micropillar array may include pillars of the same height, said height being about 6.4 μm, about 10.3 μm, about 11.5 μm, about 13.9 μm, or about 18.1 μm. In various embodiments, each micropillar 104 may be between about 5 and about 18 μm.

In various embodiments, the Cassie state may be created by coating the micropillar 104 surfaces with a hydrophobic layer, e.g., with 1H, 1H,2H,2H-perfluoroctyltriethoxysilane (PFOTS, C14H19F13O3Si, which may be obtained from Sigma-Aldrich, MO) film using chemical vapor deposition (CVD). During the coating process, the micropillar film may be placed in a vacuum drying chamber at 80 mTorr with a drop of PFOTS for 24 hours at room temperature to ensure all micropillar 104 surfaces are uniformly coated with PFOTS molecules. In various embodiments, and for the purpose of comparison, another micropillar film may be treated in an oxygen plasma chamber (PDC32 G, Harrick Plasma, NY) at a power of 18 W for 30 seconds. The hydroxyl groups (O—H bonds) generated by the oxygen plasma treatment resulted in a super-hydrophilic surface.

Figure 2:
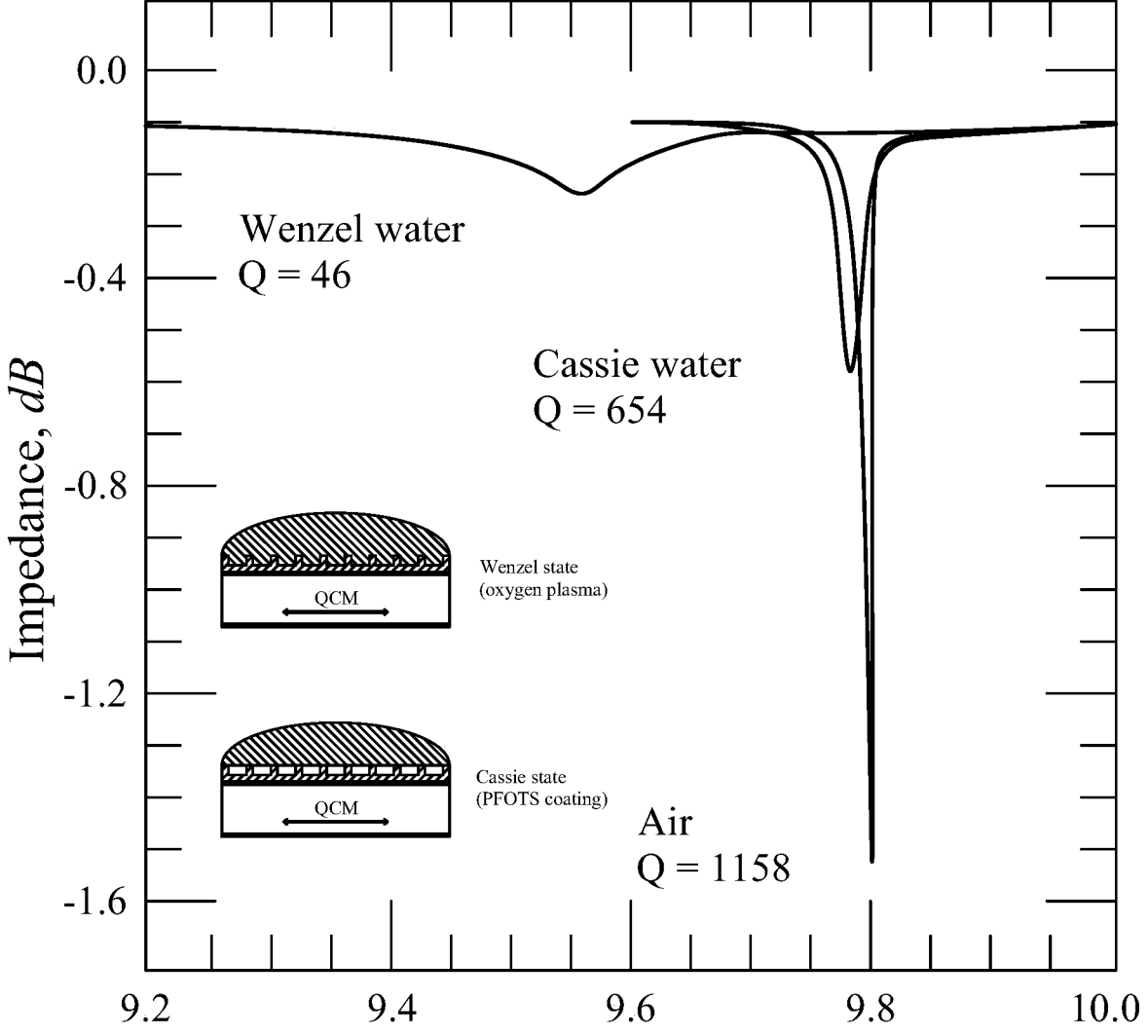
FIG. 2 an impedance spectrum and Q-factors of micropillars on a QCR substrate under Cassie and Wenzel states, in accordance with the disclosed subject matter.

Referring now to FIG. 2, the impedance spectrum and Q-factors of a viscometer 100 (μPAW device) when a deionized (DI) water drop 112 was pipette-dropped on a micropillar array 104 with a micropillar height of 13.9 μm under Cassie and Wenzel wetting states is shown. It clearly shows that the Q-factor increases from 46 to 654 when the wetting state changes from Wenzel state to Cassie state.

Referring now to FIG. 3, embodiments of a viscometer system 300 in accordance with the disclosed subject matter are shown in a schematic view. System 300 includes a micropillar enhanced acoustic wave device (viscometer 100 in one or both of a Wetzel and Cassie state), a network analyzer 304 and a PC 308 with in-house data acquisition system (DAQ). In various embodiments, network analyzer 304 may be an HP8753D, manufactured by Agilent Technologies, CA. In various embodiments, PC 308 may be a LABVIEW made by National Instruments. The admittance spectrum of the frequency signal from the viscometer 100 may be measured by the network analyzer 304 and transmitted to the PC 308 via a general purpose interface board (GPIB) board. The resonance frequency, bandwidth, and Q-factor of the signal may be extracted by fitting the spectrum into a Lorentzian curve with an in-house LabView program of PC 308.

In various embodiments, a liquid drop of 150 μL may be gently loaded on the micropillar surface by a pipette to completely cover a sensing area within viscometer 100. During the measurement, a control experiment may be conducted using DI water to establish a baseline first. Additionally, measurements may be conducted for any fluid, such as aqueous glycerol solutions (Sigma-Aldrich., MO) with concentrations ranging from 30% (3 cP) to 80% V/V (91.4 cP). All the experiments may be repeated three times to ensure the reproducibility of the measurements.

Referring now to FIG. 4, an embodiment of a modified Butterworth-van Dyke (BVD) equivalent circuit 400 for a micropillar-enabled acoustic wave viscometer operating in a fluid medium is shown. It should be noted that the quartz crystal plate between the two gold electrodes of the QCR is represented as a parallel capacitance ($C_0$) in the electrical branch. The inertia, compliance, and damping properties of a QCR are represented by an inductance ($L_1$), a capacitance ($C_1$), and a resistance ($R_1$) in the acoustic branch, respectively. $Z_{L,p}$ is the load impedance induced by the micropillars and pillar-liquid interaction. The trapped liquid between micropillars acts as an additional loading on the QCM $Z_{L,1}$ which is described by Kanazawa theory as:

$$Z_{L,l} = \frac{\eta_l(1+i)}{\delta}$$

where $\delta$ is the thickness of the layer of the liquid surrounding the cantilever, which is defined by:

$$\delta = \sqrt{\frac{2\eta_L}{\omega\rho_L}}$$

A thin PMMA residual layer (hr=3 μm) was produced during T-NIL process, and the load impedance of the layer ($Z_{L,r}$) is represented as:

$$Z_{L,r} = \omega\rho_p h_r i$$

The total load impedance induced by the micropillars on the QCR ($Z_{tot}$) can be calculated as:

$$Z_{L,tot} = Z_{L,p} + Z_{L,l} + Z_{L,r}$$

Based on small load approximation (SLA), the resonance frequency (f), half-bandwidth (HBW) ($\Gamma$), and Q-factor (Q) of the QCR device due to the additional load can be expressed as:

$$f = f_0 - \frac{f_0}{\pi} \mathrm{Re}\left(\frac{iZ_{L,tot}}{Z_q}\right)$$

$$\Gamma = \Gamma_0 + \frac{f_0}{\pi} imag\left(\frac{iZ_{L,tot}}{Z_q}\right)$$

$$Q = \frac{f}{2\Gamma}$$

where $f_0$ and $\Gamma$ are the fundamental resonance frequency and HBW of quartz resonator in air. The load impedance $Z_{L,p}$ induced by micropillar vibration in the liquid under Cassie and Wenzel states are described below.

Load Impedance Induced by Micropillars in Wenzel State

The micropillar can be treated as a uniform Euler-Bernoulli beam oscillating in a liquid. The governing equation is given by:

$$\frac{d^4\hat{W}(\hat{x}\mid\omega)}{d\hat{x}^4} - \frac{\dot{m}\omega^2 L^4}{EI}\left(1 + \frac{\pi\rho_p b^2}{4\dot{m}}\gamma(\omega)\right)\hat{W}(\hat{x}\mid\omega) = 0$$

The associated boundary conditions are given below:

$$\hat{W}(0\mid\omega) = u_0$$

$$\frac{d\hat{W}(0\mid\omega)}{d\hat{x}} = 0$$

$$\frac{d^2\hat{W}(1\mid\omega)}{d\hat{x}^2} = 0$$

$$\frac{d^3\hat{W}(1\mid\omega)}{d\hat{x}^3} = 0$$

Where ω is the angular frequency of the micropillar, E is the young modulus of micropillars, and I the momentum of inertia of micropillars. $\dot{m}$ is the mass per unit length of the micropillar and $\rho_p$ is the density of micropillars. $U_0$ is the displacement of the top surface of the quartz plate. The solution takes the form of:

$$\hat{W}(\hat{x}\mid\omega) = u_0(C_1\cos(\beta\hat{x}) + C_2\sin(\beta\hat{x}) + C_3\cosh(\beta\hat{x}) + C_4\sinh(\beta\hat{x}))$$

Where:

$$\beta^4 = \frac{\dot{m}\omega^2 L^4}{EI}\left(1 + \frac{\pi\rho_p b^2}{4\dot{m}}\gamma(\omega)\right)$$

As a result, the load impedance ($Z_{L,p}$) caused by micropillars can be calculated as:

$$Z_{L,p} = \frac{\tau}{v_0} = \frac{EI\beta^3(C_4 - C_2)}{AL^3\omega i}$$

Where A is the area of a unit cell of micropillar, t is the tangential stress, and $v_0$ is the tangential velocity. Therefore, the total load impedance ($Z_{tot}$) can be written as $$Z_{tot} = \frac{EI\beta^3(C_4 - C_2)}{AL^3\omega i} + \frac{\eta_l(1+i)}{\delta} + \omega\rho_p h_r i$$

Load Impedance Induced by Micropillars in Cassie State

When the μPAW device operates in the Cassie state (DOM), only the tops of the micropillars interact with the liquid. The governing equation for the vibration of a uniform Euler-Bernoulli beam reduces to:

$$\frac{d^4\hat{W}(\hat{x}\mid\omega)}{d\hat{x}^4} - \frac{\dot{m}\omega^2 L^4}{EI}\hat{W}(\hat{x}\mid\omega) = 0$$

The oscillating liquid layer on the tops is treated as a damper to the micropillars, and the complex wall shear stress acting on the tip can be determined as:

$$F_t = \frac{b^2\eta_L\omega}{\delta}\hat{W}(L\mid\omega)(1+i)$$

9
10

With its associated boundary conditions as:

$$\hat{W}(0|\omega) = u_0$$

$$\frac{d\hat{W}(0|\omega)}{d\hat{x}} = 0$$

$$\frac{d^2\hat{W}(1|\omega)}{d\hat{x}^2} = 0$$

$$EI\frac{d^3\hat{W}(1|\omega)}{d\hat{x}^3} + F_t = 0$$

The nontrivial solution has a similar form as the previous one given by:

$$\hat{W}(\hat{x}|\omega) = u_0(C_1\cos(\beta\hat{x}) + C_2\sin(\beta\hat{x}) + C_3\cosh(\beta\hat{x}) + C_4\sinh(\beta\hat{x}))$$

Where:

$$\beta^4 = \frac{\dot{m}\omega^2 L^4}{EI}$$

As a result, the total load impedance on the QCM substrate for DOM becomes:

$$Z_{tot} = \frac{EI\beta^3(C_4 - C_2)}{AL^3\omega i} + \omega\rho_p h_r i$$

It should be noted that the load impedance due to the trapped liquid ($Z_{L,1}$) is not included.

Figure 5:
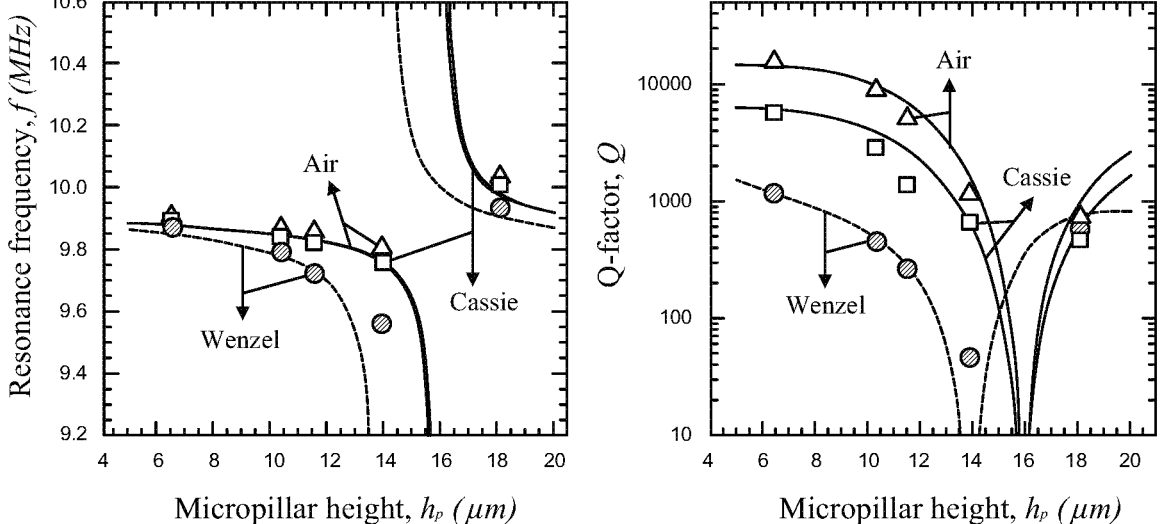
FIGS. 5A and 5B are plots of resonance frequency and Q-factor versus micropillar height in accordance with the disclosed subject matter.

Referring now to FIGS. 5A-5B, a comparison of model predictions for resonance frequency and Q-factor for the viscometer 100 operating in air, Cassie and Wenzel states with measured values is shown. It can be seen that a coupled resonance phenomenon took place between the quartz crystal plate (QCM 108) and the micropillars 104, yielding a nonlinear resonance frequency and corresponding Q-factor response vs. micropillar heights. As micropillar height or the mass of micropillars increases, the resonance frequency decreases, which is consistent with Sauerbrey theory. When the micropillar height approaches a critical height, a sudden drop and jump behavior is observed due to the coupling between the micropillars and the quartz crystal resonator. In the meantime, the Q-factor of viscometer 100 decreases as well with the increase of micropillar 104 height.

The modeling results shown in FIG. 5A demonstrate the capability of the model in predicting the resonance frequency and Q-factor of the devices acting in DI water under the Cassie and Wenzel states. It is worth noting that the μPAW viscometer 100 device with the super-hydrophilic surface (fully penetrated state) shows more frequency shifts in comparison to the DOM devices with superhydrophobic surfaces (Cassie state). This is mainly due to more liquid between micropillars 104 moving with the micropillars when the device is in the Wenzel state, while for the DOM device, only the liquid on the micropillar 104 tops was disturbed by the vibration of the micropillars 104. Furthermore, the critical height of the micropillars of the viscometer 100 DOM device (~15.8 μm) is very close to that of the viscometer 100 in the air (~16 μm). However, liquid penetration in the Wenzel state results in a shift in the critical height (~14 μm) due to the induced hydrodynamic loadings on the micropillars 104. FIG. 5B also shows viscometer 100 operating in DI water displays a much lower Q-factor than in the air due to the liquid damping. A 50% reduction in Q-factor was observed for the viscometer 100 DOM device in water compared to the air. However, the Q-factor is reduced by orders of magnitude in the Wenzel state due to the complete penetration of the liquid in between the micropillars 104. It can be noticed that the minimum Q-factor occurred when the micropillar height approached its respective critical heights independent of the wetting conditions.

Figure 6:
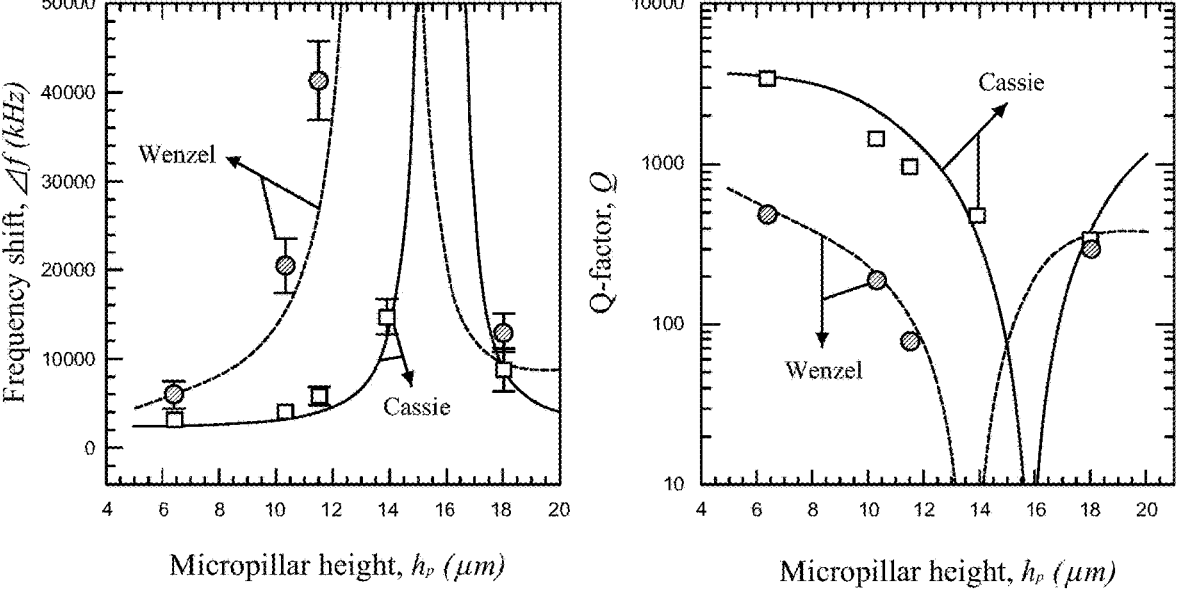
FIGS. 6A and 6B are plots of frequency shift and Q-factor versus micropillar height in accordance with the disclosed subject matter.

Referring now to FIGS. 6A-6B are plots of frequency shift and Q-factor versus micropillar height, respectively. FIG. 6A presents the effect of the wetting state on the resonance frequency shift of viscometer 100 operating in glycerol solution with a concentration of 40 V/V % (viscosity: 4.8 cP). The experimental results show that the viscometer 100 in the Wenzel state show higher frequency shifts than viscometer 100 in the Cassie state due to the existence of liquid between micropillars 104. The reason is that for the viscometer 100 operating in the Cassie state, liquid-micropillar interactions occur only at the tops of the micropillars 104. The DOM based μPAW viscometer 100 in the Cassie state shows a maximum frequency shift of 14.8 kHz, while the shift in the Wenzel state increases to a maximum value of 41.3 kHz as the micropillar 104 height approaches the Wenzel state critical height. FIG. 6B illustrates the Q-factor measurement for both devices in different wetting states. As can be seen, the Q-factors of viscometer 100 depend on both the height and hydrophobicity of the micropillars 104. The Q-factor of super-hydrophilic micropillars 104 is typically one order of magnitude lower than superhydrophobic micropillars 104, resulting in a significantly higher noise level.

Glycerol Solution Measurement

Figure 7:
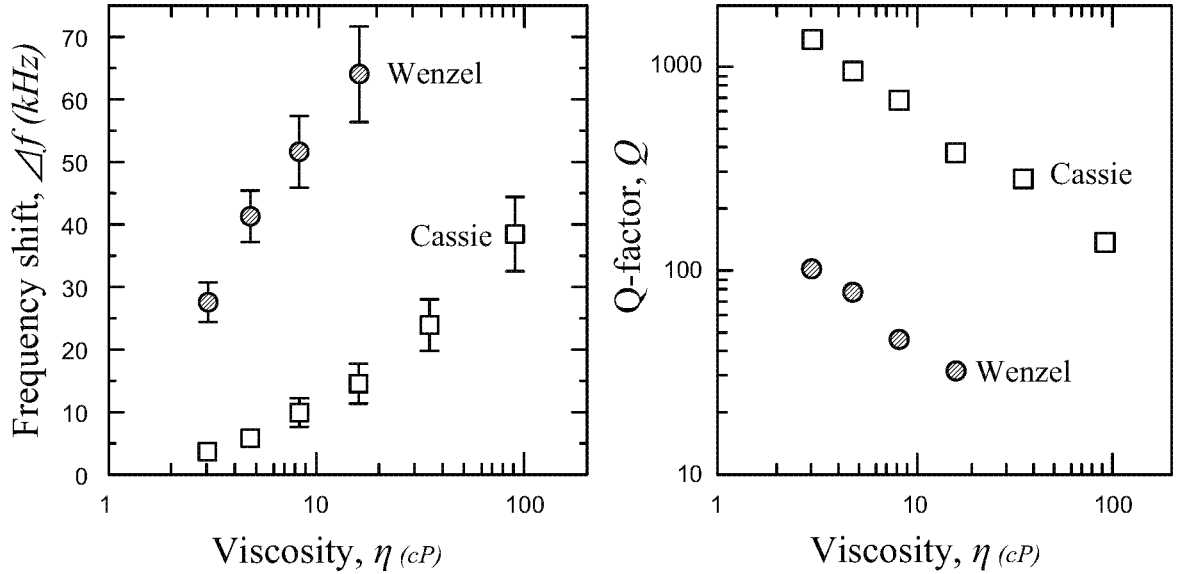
FIGS. 7A and 7B are plots of frequency shift and Q-factor versus viscosity measurement in accordance with the disclosed subject matter.

To demonstrate the capability for the viscosity measurement, a DOM based μPAW viscometer 100 with a micropillar 104 height of 11.5 μm was used for glycerol solutions with viscosity ranging from 3 cP to 91.4 cP (concentration: 30 to 80% V/V) under Cassie and Wenzel states. The results of the frequency shift and Q-factor are shown in FIGS. 7A-7B. It can be seen that as the viscosity of the solution increases, the frequency shift increases and the Q-factor decreases due to increasing penetration layer thickness and energy dissipation of the micropillars 104. The μPAW viscometer 100 operating in the Wenzel state can only measure the viscosity up to 16 cP (60% V/V) due to a significant low Q-factor (below 50). However, the DOM based μPAW viscometer 100 device can significantly improve the Q-factor level and extend the viscosity range over 90 cP while maintaining Q-factor within an acceptable level (>100).

The performance of the drop-on-micropillar (DOM) concept based micropillar-enhanced acoustic wave devices was investigated experimentally and theoretically for viscosity measurement of aqueous glycerol solutions with viscosity ranging from 3 cP to 91.4 cP. The results demonstrated that superhydrophobic micropillars 104 can provide a reliable Cassie wetting state which is critical for measuring high viscosity liquid at a high sensitivity and enhanced Q-factor in comparison to hydrophilic micropillars 104. The micropillars 104 vibrating under Cassie state have a much-reduced energy dissipation caused by weak interactions between the micropillars and air trapped between the micropillars. On the other hand, the micropillar-enhanced acoustic wave device operating in a fully penetrated wetting state suffers high energy dissipation due to the increased damping effect from the liquid and rapidly decreased Q-factor. The theoretical model based on the Euler-Bernoulli beam theory and the small load approximation can accurately predict the frequency shift and quality factor of the DOM devices. It is evident that employing the DOM concept provides a new way of measuring high-viscosity solutions using micropillar-enhanced acoustic wave devices.

Flow Cell Embodiment

Figure 8:
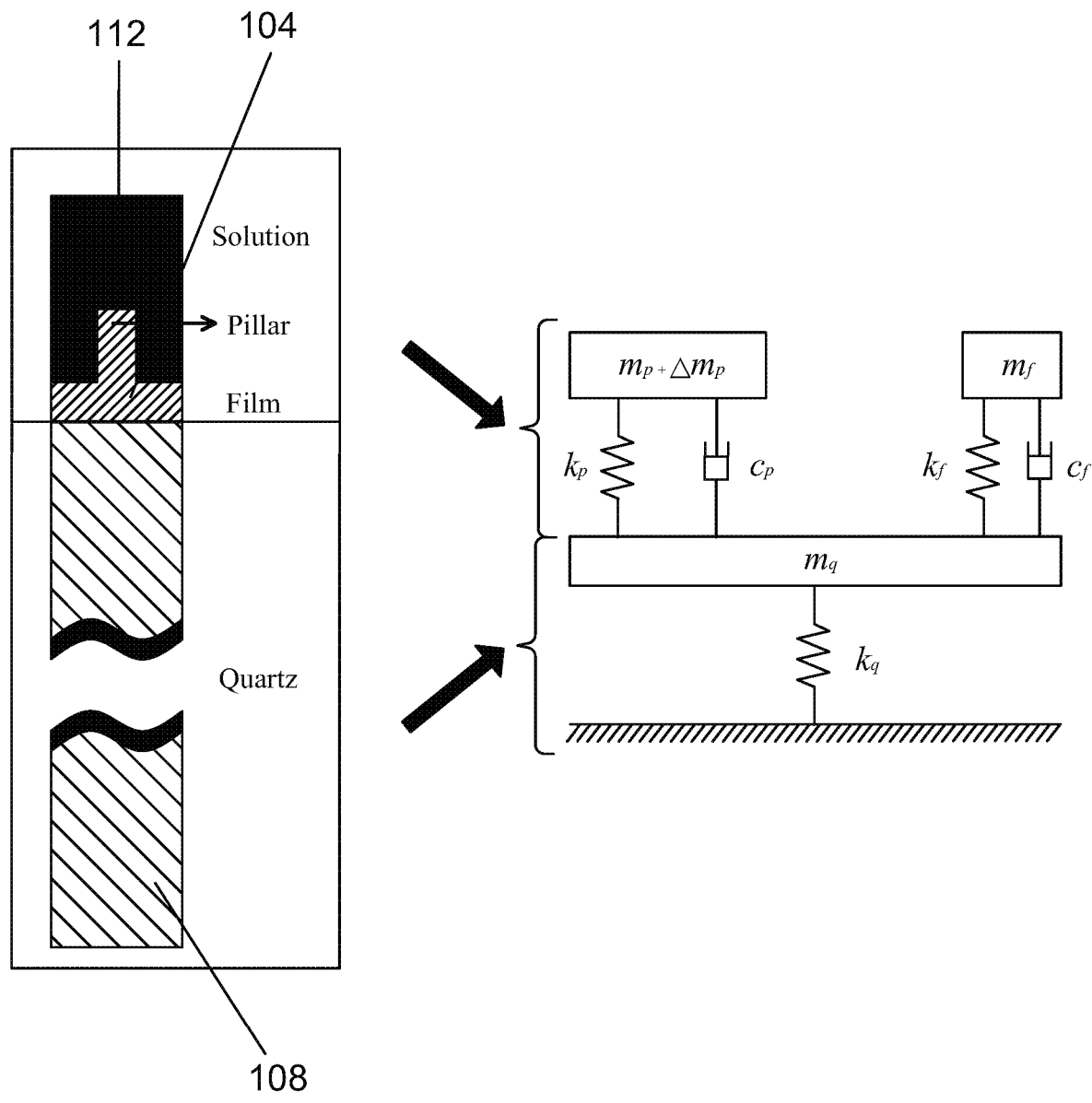
FIG. 8 is a schematic representation of a micropillar and substrate system modeled as a multi-degree-of-freedom model for a μPAW operating in a liquid solution.

Referring now to FIG. 8, a multi-degree-of-freedom model for μPAW operating in a liquid solution is shown in schematic view. In accordance with various embodiments, disclosed herein is an ultra-sensitive micropillar enabled QCM viscometer made by fabricating well-defined polymethyl methacrylate (PMMA) micropillars 104 on a QCM substrate 108 (μPAW or interchangeably, QCM-P) to achieve an ultrahigh sensitivity to the solution viscosity with a stable response due to a unique resonant coupling between the micropillar and quartz substrate vibrations. The μPAW based viscometer shows twentyfold improvement in viscosity measurement sensitivity over traditional QCM viscometer and achieved a limit of detection (LOD) as low as 0.053 wt % of sucrose liquid.

Quartz crystal microbalance (QCM) device is a bulk acoustic wave (BAW) piezoelectric sensor oscillating in thickness-shear mode (TSM). The sensing mechanism of a QCM is based on detecting the resonant frequency shift resulting from surface mass loading and near-surface liquid layer viscoelastic properties. The typical sensing resolution of a QCM device operating in a gas phase is approximately 1 ng/cm$^2$ per Hz, while the reliable measurement for a mass accumulation is up to 100 μg/cm$^2$. The sensing capacity of QCM devices can be versatile as the sensor surface can be easily functionalized with chemical sensing materials. For example, QCM-based devices were first used to detect xylene and became the primary sensing tool for detecting volatile organic compounds. In addition, the QCMs can operate in liquids where part of the shear vibration is transferred to the liquid, causing elastic energy dissipation in the surrounding liquid medium. This interaction results in the frequency shift, which is described by the Kanazawa and Gordon's model and given by:

$$\Delta f_k = -\frac{f_0^{3/2}}{Z_q} \sqrt{\frac{\rho_L \eta_L}{\pi}} \qquad (1)$$

where $\rho_L$ and $n_L$ are the density and viscosity of the interacting fluid, respectively. $Z_q$ and $f_o$ represent the mechanical impedance of the quartz substrate and the natural frequency of the quartz. As can be seen, the change in $\rho_L \eta_L$ leads to the frequency shift ($\Delta f$). For example, Table 2 presents the frequency shift of the 10 MHz QCM in responding to the viscosity of the aqueous solutions.

TABLE 2

| Frequency shift of bare QCM (10 MHz) for different solutions | | |
| --- | --- | --- |
| Solution | Frequency shift (Hz) | QCM Measured Avg. Viscosity (cP) |
| NaCl (30% wt) | 133 | 1.5563 |
| HCl (30% wt) | 97 | 1.4829 |
| KCl (30 wt %) | 47 | 0.952 |

The viscometers described herein operate by coupling the vibrations of polymer micropillars 104 and QCM quartz 108 (μPAW) to form a two-degrees-of-freedom resonant system, resulting in significant mass sensitivity enhancement over traditional QCM device. The sensitivity enhancement of μPAW in acrylic acid grafting and bovine serum albumin (BSA) ar3 folds and 27 folds, respectively. For the μPAW operating in air or vacuum, the damping effect of the surrounding solutions was negligible, and the frequency response of a μPAW can be simply analyzed by treating the assembly of QCM (m$_q$, k$_q$) and the micropillar (m$_p$, k$_p$) as a two mass-spring system. However, when the μPAW operates in a liquid medium, the dynamic response of the μPAW system becomes more complicated. As shown in FIG. 8, it depends on several factors, such as micropillar geometry, hydrodynamic loading of liquid on the pillars, and mechanical properties of the pillar material. In this model, the induced hydrodynamic loading on micropillars is represented by damping (c$_p$) and an additional mass (Δm$_p$). The trapped liquid between the micropillars (within the decay length of the shear wave) acts as a classical viscous loading, represented by m$_f$, k$_f$ and c$_f$ as described by the Kanazawa equation. In addition, the vibration of the micropillars 104 can be affected by nearby micropillars 104 depending on the viscosity of the surrounding solution 112.

Figure 9:
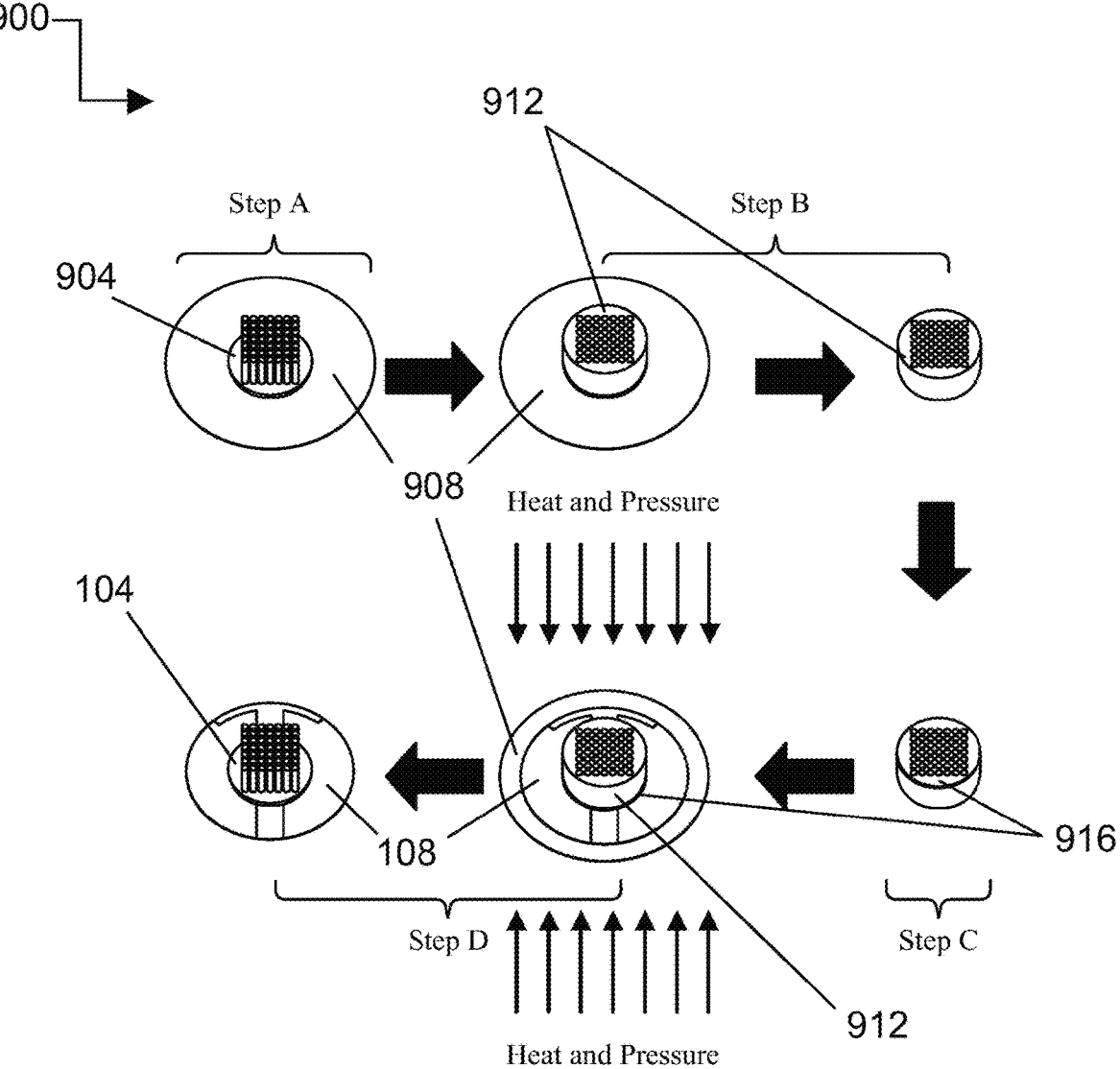
FIG. 9 is a flow chart of fabrication of PMMA micropillars on a QCM substrate in accordance with the disclosed subject matter.

Referring now to FIG. 9, a flow chart depicting a method 900 for fabrication of an array of micropillars 104 on a QCM substrate to form a μPAW is shown in schematic view. The fabrication process of PMMA micropillar 104 for the μPAW 1112 may include four sequential steps. Step A may include preparation of SU-8 mother mold 904. In various embodiments, SU-8 mother mold 904 may be a photosensitive polymer mold in which micro patterns are fabricated on a wafer with SU-8, an epoxy-based negative photoresist. The SU-8 mother mold 904 may be disposed on one or more plates, such as a silicon plate 908. In various embodiments, the silicon plate 908 may have a planform circular or round shape. In various embodiments, the silicon plate 908 may be rectilinear. Method 900 may further include step B of forming a replica of the mold as a polydimethylsiloxane (PDMS) transfer mold 912. The PDMS transfer mold 912 may be removed from the SU-8 mother mold 904. The method 900 includes, at Step C, filling the PDMS transfer mold 912 with PMMA 916 by spin coating. In various embodiments, spin coating may include any suitable method of spin coating. For example and without limitation, spin coating may generate thin and homogeneous organic films out of solutions. An excess amount of solution is placed on an ultra-porous substrate that is then rotated at high speed. The liquid PMMA 916 spreads due to centrifugal forces and a uniform liquid layer forms on the substrate, as shown in FIG. 9. Method 900 includes, at step D, Thermal Nanoimprinting Lithography (T-NIL) to coat the PMMA micropillars (104) on the QCM substrate 108. After nanoimprinting, a thin residual layer (~3 μm) is generated at the bottom of the PMMA micropillars 104. For fabricating a traditional PMMA film-based QCM (QCM-F), only a thin residual layer (~3 μm) is attached to the sensing area. The micropillars 104 have a square cross-section with a 10 μm side length (D) and a 21 μm center-to-center spacing(S). Four different micropillar heights are used in the experiment: 5, 10, 13.6, and 18 μm. It was shown that the critical height of μPAW sensors 1112 for the current micropillar formation was close to 13 μm in water, where maximum mass sensitivity was achieved (ultra-sensitive zone).

FIG. 10 shows four depictions of scanning electron microscope (SEM) images of PMMA micropillars 104 with heights of (A) 5 μm, (B) 10 μm, (C) 13.6 μm, and (D) 18 μm, respectively. The PMMA micropillars are characterized using a field emission scanning electron microscope (FE- SEM) (JSM-7401F, JEOL). The SEM images of PMMA micropillars are illustrated in FIG. 3. The micropillars have a square cross-section with a length of 10 µm, a center-to-center spacing(S) of 21 µm, and a height (H) of 5 µm, 10 µm, 13.6 µm, and 18 µm. As can be seen, the well-defined PMMA micropillar structures are successfully transferred onto the QCM surface with a thin residual layer by the T-NIL process.

Figure 11A:
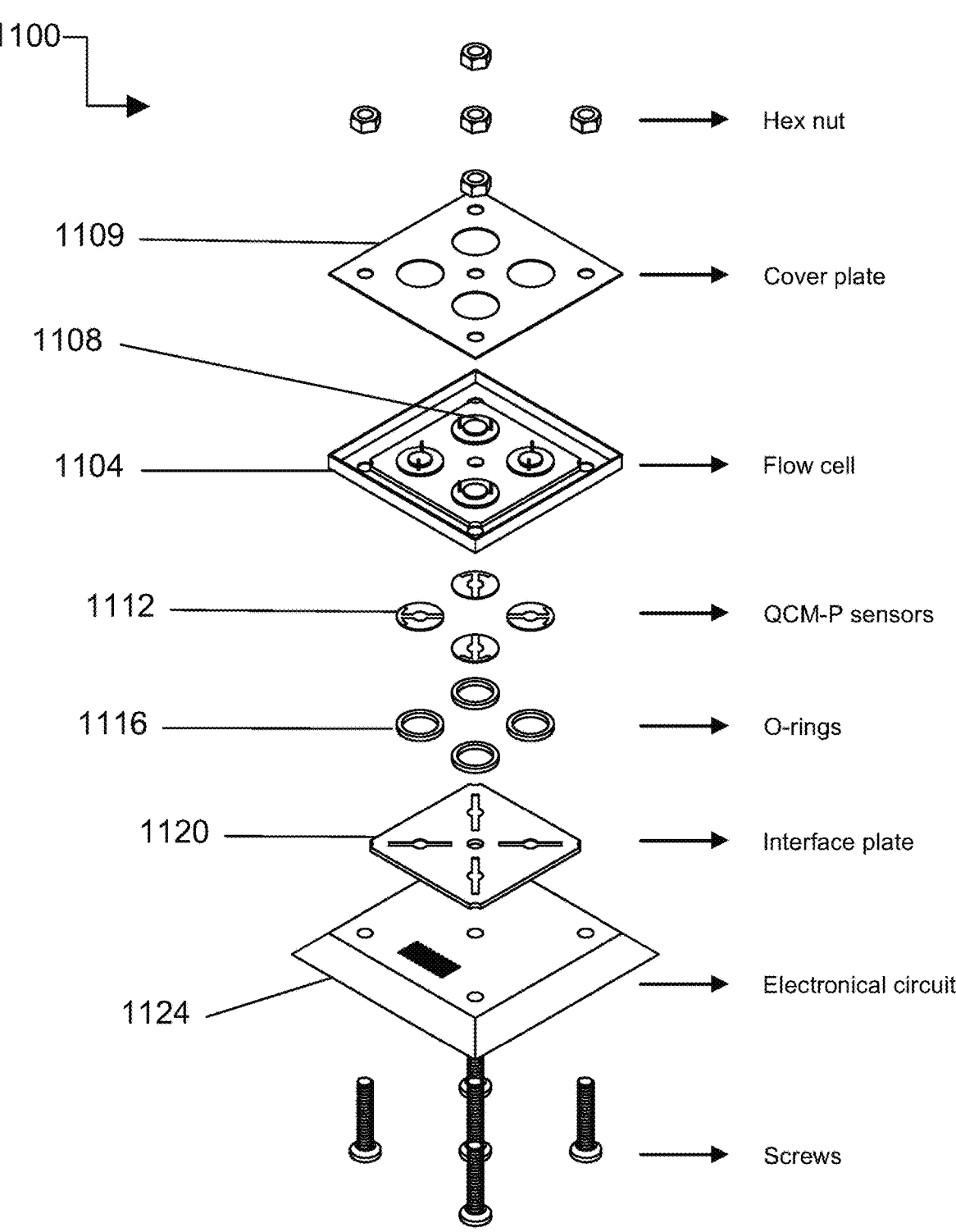
FIG. 11A is a schematic exploded view of a flow cell viscometer in accordance with the disclosed subject matter.
Figure 11B:
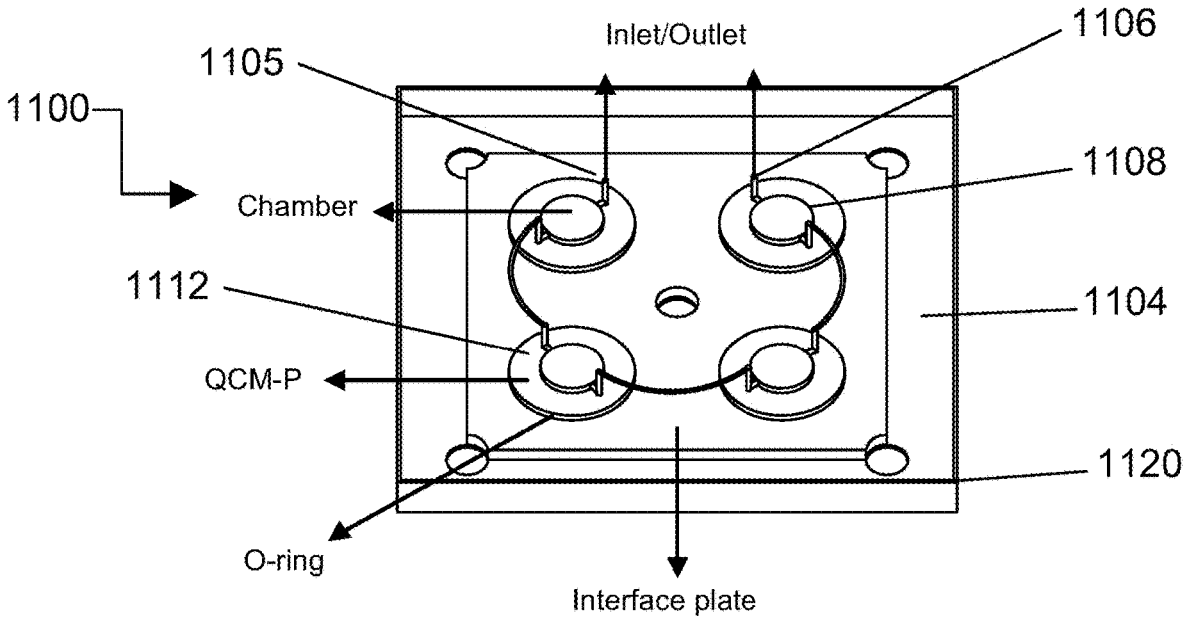
FIGS. 11B and 11C are schematic and pictorial representations of a flow cell in accordance with the disclosed subject matter.
Figure 11C:
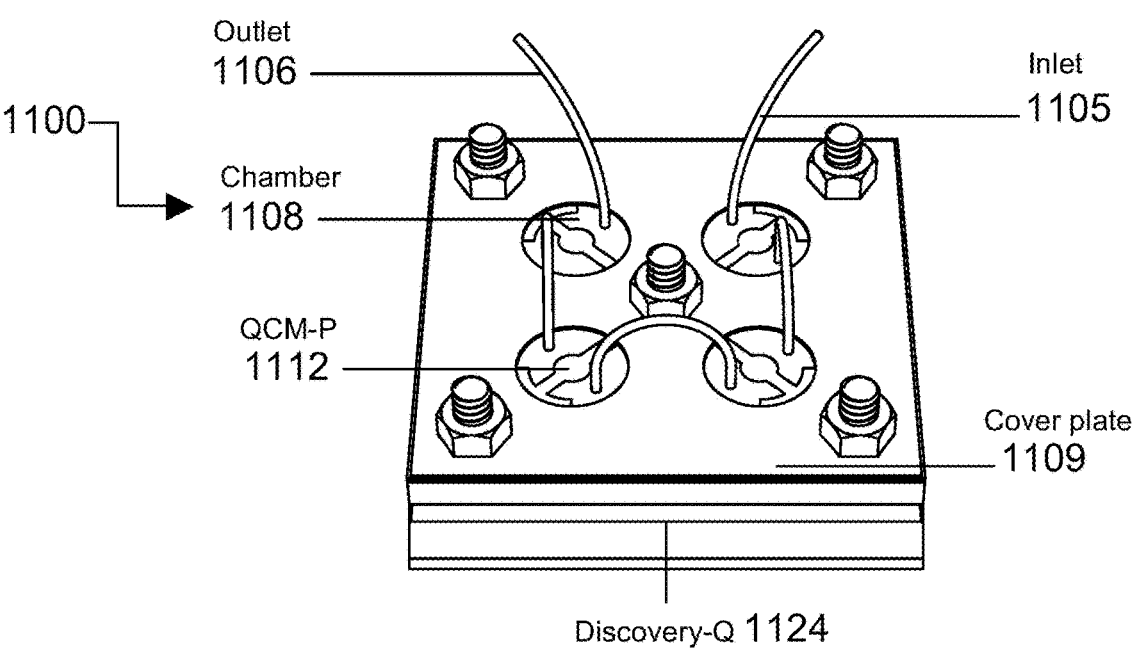

Referring now to FIGS. 11A-11C, a micropillar-enabled acoustic wave viscometer 1100 is shown in exploded, schematic and perspective views, respectively. A micropillar-enabled acoustic wave viscometer 1100 includes a flow cell 1104. The flow cell 1104 includes at least one sensor well 1108 disposed within the flow cell 1104. Flow cell 1104 has a fluid inlet 1105 in fluid communication with the sensor well 1108. The fluid inlet 1105 is configured to deliver a fluid (which may be the same as fluid drop 112) to the sensor well 1108. Fluid inlet 1105 may be a cylindrical tube having a flexible or rigid construction. The fluid inlet 1105 may be in fluid communication with a pump, syringe or other device configured to alter the pressure of the fluid and drive flow. Flow cell 104 includes a fluid outlet 1106, the fluid outlet 1106 in fluid communication with the sensor well 1108 and the fluid inlet 1105. The fluid outlet 1106 is configured to deliver fluid out of the sensor well 1108.

Flow cell 1104 has a cover plate 1109 disposed over the flow cell 1104. The cover plate 1109 may be generally planar and have a planform rectilinear shape. Cover plate 1109 may have cutouts therethrough. In various embodiments, cover plate 1109 may have cutouts corresponding to one or more sensor wells 1108. In various embodiments, there may be a cutout corresponding to each sensor well 1108.

A µPAW sensor 1112 is disposed in each of the sensor wells 1108. Each µPAW sensor 1112 having a quartz crystal microbalance (QCM) substrate, at least one micropillar having a first end and a second end, defining a height therebetween, the at least one micropillar disposed QCM substrate at the first end and extending perpendicular to the QCM substrate. In various embodiments, a film disposed between the at least one micropillar and the QCM substrate, µPAW sensor 1112 may be the same or similar to the viscometer 100 as described herein.

Viscometer 1100 includes an interface plate and a frequency measurement system in electrical communication with the sensor 1112. The flow cell 1104 may include four sensor wells 1108 for µPAW sensors 1112, which are connected to the frequency measurement system, which may be a Discovery-Q platform circuit disposed underneath the flow cell 1104. Flow cell 1104 may be designed in a 3D computer-aided design (CAD) platform, such as SolidWorks. In various embodiments, flow cell 1104 may be fabricated using one or more additive manufacturing techniques, such as soft lithography. In various embodiments, 3D printing may be utilized to produce the mold for the soft lithography of the flow cell 1104, or any component described herein.

Still referring to FIGS. 11A-11C, the viscometer 1100 includes the frequency measurement system 1124, which may be an electronic oscillator circuit board, interface plate 1120, O-rings 1116, µPAW sensors 1112, flow cell 1104, and cover plate 1109. In various embodiments, cover plate 1109 may be formed as a stainless-steel plate. After micropillars (104) are fabricated on the quartz plate (108), the sensors 1112 are gently placed on the top of conducting O-rings 1116 in the sensor wells 1108 of the flow cell, as shown in FIG. 11B. Then PDMS flow cell 1104 is pressed on top of the µPAW sensor 1112 and sandwiched between the cover plate 1109 and the frequency measurement system 1124 (oscillator circuit board of the Discovery-Q system). The electrical signal generated by the sensors 1112 in response to the measurements is transmitted to the DAQ unit of the system 1124 and analyzed by the in-house software for display and analysis. The metallic cover plate 1109 is used to maintain the surface flatness of the PDMS flow cell 1104 and prevent leakage using screw-tightening. In various embodiments, the components of the viscometer 1100 may be held together by a plurality of mechanical fasteners, such as bolts and nuts, as shown in the figures. In various embodiments, the components may be integrally formed, fastened by alternate mechanical fasteners or adhesives. Viscometer 1100 may include one or more fabrication steps starting with fabricating a well-controlled PMMA micropillar 104 on a QCM substrate 108 using Nanoimprinting Lithography (NIL) as described hereinabove in reference to viscometer 100. Then a microfluidic viscometer 1100 is formed by integrating the µPAW sensor 1112 with a commercial Discovery-Q (Invetrometrix) platform 1124.

Figure 12:
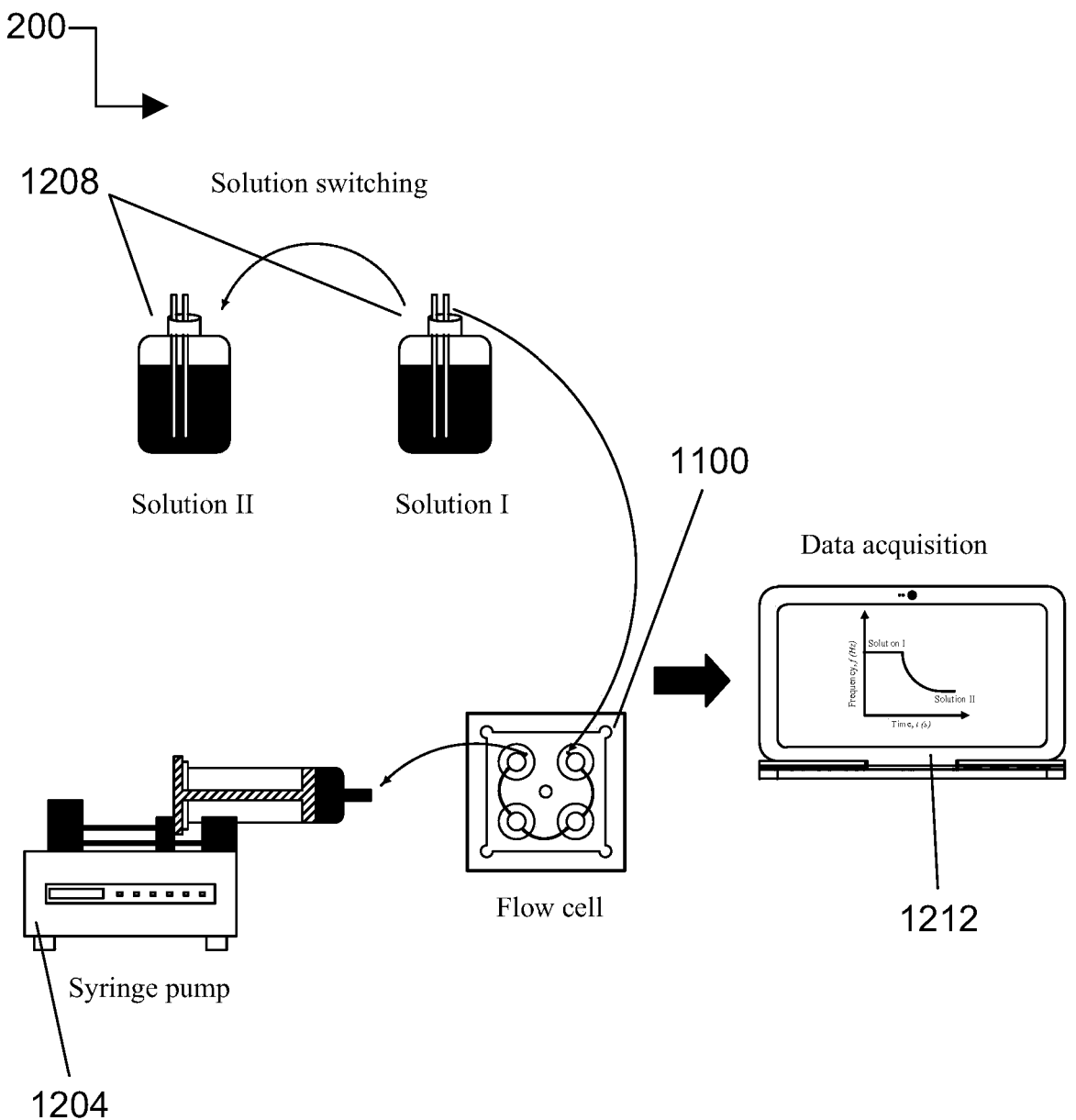
FIG. 12 is a schematic and pictorial representation of a flow cell in accordance with the disclosed subject matter.

Referring now to FIG. 12, a schematic and pictorial view of a system 1200 for measuring viscosity of a fluid utilizing viscometer 1100 in accordance with the disclosed subject matter. System 1200 for measuring viscosity of a fluid utilizing viscometer 1100 includes syringe pump 1204, solution containers 1208, and data acquisition (DAQ) components 1212. The system 1200 may operate as follows: DI water is pumped into the sensor well 1108, and the frequency response of sensors 1112 is recorded to obtain the base line measurement. In various embodiments, each sensor well 1108 may be fluidly connected in series, such that fluid enters each well after it exits previous well. For example, and without limitation, the fluid may enter each of four sensor wells 1108 in series, and then exit the flow cell 1104 and into the solution containers. In various embodiments, next, the sucrose solutions 1208 at different concentrations are driven into the sensor well 1108 and the response frequencies are recorded. Sucrose solutions 1208 with different concentrations (0.2-50 wt %) are prepared by adding sucrose powder to a glass vial (20 ml) on an electronic scale and then adding DI water into the vial. The vial is heated on a hotplate and stirred with a magnetic stirrer at 100° C. for 30 minutes and cooled down to room temperature. It is worth noting that all the experiments may be repeated several times to ensure the repeatability of the developed µPAW sensors.

Analytical Model

For a traditional QCM viscometer device operating in a liquid, the oscillation of quartz results in a shear wave in a thin liquid layer of thickness of nanometer scale (decay length, δ) near its surface. The resulted frequency shift of the device is related to the viscosity and density of the liquid. The frequency response of the QCM operating in a liquid solution can be determined by the effective liquid layer mass on the QCM's surface. The decay length and effective mass are expressed as:

$$\delta = \sqrt{\frac{2\eta_L}{\omega\rho_L}}$$

and $$\Delta m = A\rho_L\delta/2$$

15

Where Δm is the effective mass and A is the sensing area. For a μPAW sensor 1112, the micropillars vibrate in a similar way to the microscale cantilever beam vibrating in a liquid. The following assumptions are used in evaluating the frequency response of the micro-cantilever beam: 1) the beam

16

$$\begin{bmatrix} m_{q,eff} & 0 \\ 0 & m_{p,eff} \end{bmatrix}\begin{pmatrix} \ddot{x}_1 \\ \ddot{x}_2 \end{pmatrix}+\begin{bmatrix} k_q+k_p & -k_p \\ -k_p & k_p \end{bmatrix}\begin{pmatrix} x_1 \\ x_2 \end{pmatrix}=\begin{pmatrix} 0 \\ 0 \end{pmatrix}$$

And the results show the frequency as:

$$f = \frac{1}{2\pi}\sqrt{\frac{1}{2}\left(\frac{k_q}{m_{q,eff}}+\frac{k_p}{m_{q,eff}}+\frac{k_p}{m_{p,eff}}\right)\pm\frac{1}{2}\left[\left(\frac{k_q}{m_{q,eff}}+\frac{k_p}{m_{q,eff}}+\frac{k_p}{m_{p,eff}}\right)^2-4\frac{k_q}{m_{q,eff}}\frac{k_p}{m_{p,eff}}\right]^{1/2}}$$

has a uniform cross-section over the entire length; 2) the length of the beam exceeds the width of the beam; 3) the beam is an isotropic linearly elastic solid, and internal frictional effects are negligible; and 4) the amplitude of vibration of the beam is far smaller than any length scale in the beam geometry.

By considering an induced hydrodynamic loading on the beam. The frequency response of micropillar operating in viscous solution is expressed as (see Supplementary materials):

$$\omega = \frac{\beta^2}{H^2}\sqrt{1+\frac{\pi\rho_L W^2\gamma_1}{4\dot{m}}}^{-1/2}\sqrt{\frac{EI}{\dot{m}}}$$

Where ω is the angular frequency of the micropillar, E is the Young's modulus of micropillars, and I is the momentum of inertia of micropillars. H and W is the height and side of micropillars and m is the mass per unit length of the micropillar. $\gamma_1$ is the real part of induced hydrodynamic loading on rectangular micropillars. The analytical approximation of $\gamma_1$ on rectangular micropillars is expressed as:

$$\gamma_1 = a_1+a_2\frac{\delta}{W}$$

Where $a_1$ and $a_2$ two constants with values of 1.0553 and 3.7997. The value of β can be found by solving the following equation:

$$[1+\cos(\beta)\cosh(\beta)]+\beta\varphi[\cos(\beta)\sinh(\beta)-\sin(\beta)\cosh(\beta)]=0$$

where $$\varphi = \frac{m_t}{\dot{m}L}$$

$m_t$ is an additional liquid layer moving at the tip of the micropillar. As a result, the frequency response of micropillars in viscous solution was obtained by solving equations (1-4) concurrently. At the same time, the frequency response of μPAW can be obtained from the two-degree-of-freedom systems analysis with additional effective masses resulting from the induced hydrodynamic loading on the QCM and micropillars (see FIG. 1). In this, the 10 MHz quartz substrate is treated as the primary resonator with effective mass ($m_{q,eff}$) and force constant ($k_q$) and the micropillar as the second resonator with effective mass ($m_{p,eff}$) and force constant ($k_p$). As a result, the resonant frequency of the μPAW sensor can be obtained by solving:

The coupled resonance frequencies of μPAW sensors with varying micropillar heights are predicted by solving Equations (1)-(6) simultaneously.

As the Kanazawa-Gordon equation indicates, in a Newtonian liquid, the relationship between the observed frequency shift of a traditional QCM and the density-viscosity of the liquid follows by:

$$\Delta f_k \sim \sqrt{\rho_L\mu_L}$$

Figure 13:
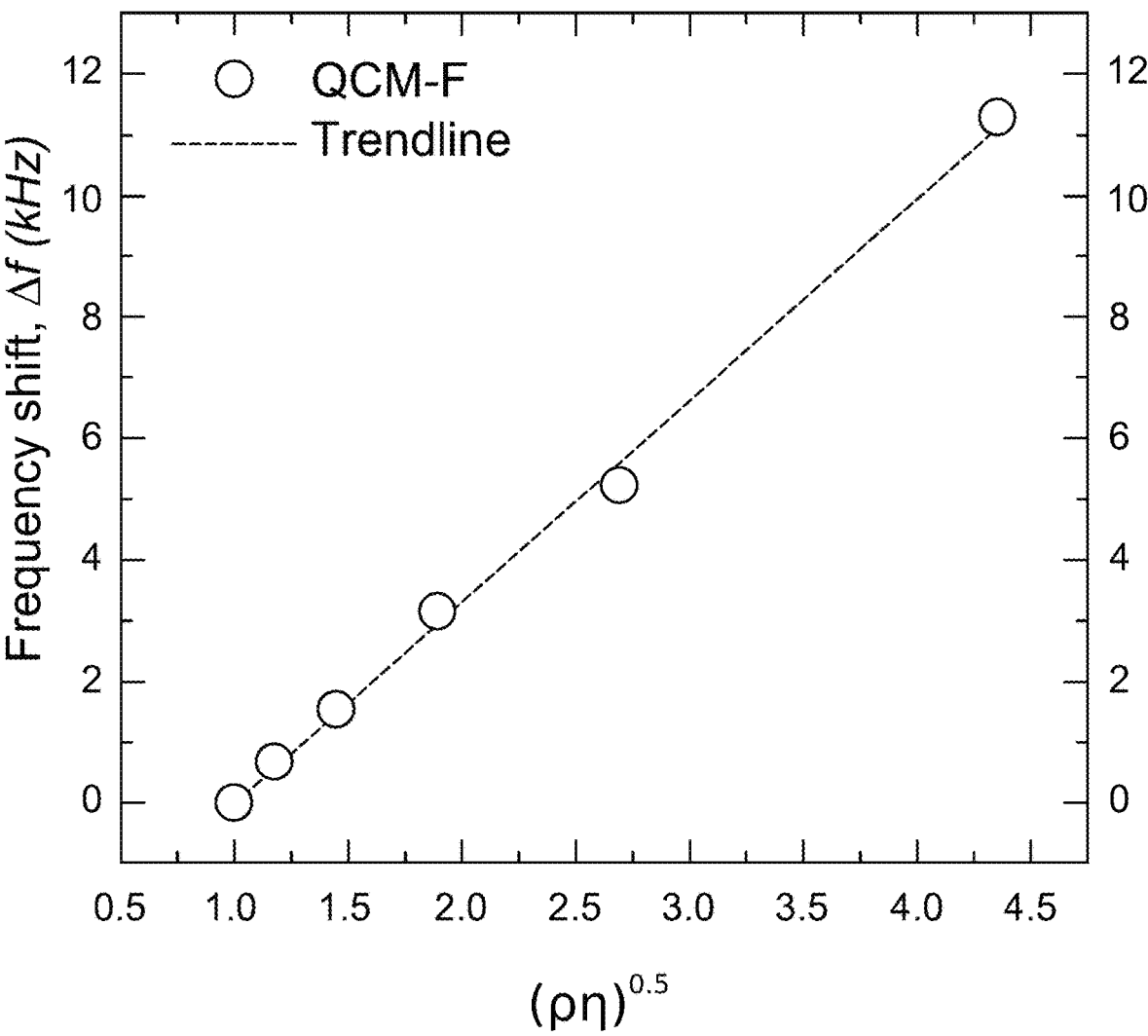
FIG. 13 is a plot of a comparison of experimental results of QCM-F with the prediction of the Kanazawa-Gordon model.

FIG. 13 presents the frequency response of QCM-F in the stationary sucrose solutions under different concentrations with respect to $\sqrt{\rho_L\mu_L}$. There is a good agreement in the frequency response between the measured frequency shifts and the predictions from the Kanazawa-Gordon equation ($R^2$=0.994). It is worth noting that the residual layer (~3 μm) is so thin that the effect of the layer on the sensor's sensitivity is negligible. In addition, the effect of particle adsorption on the PMMA surface is minor.

Figure 14:
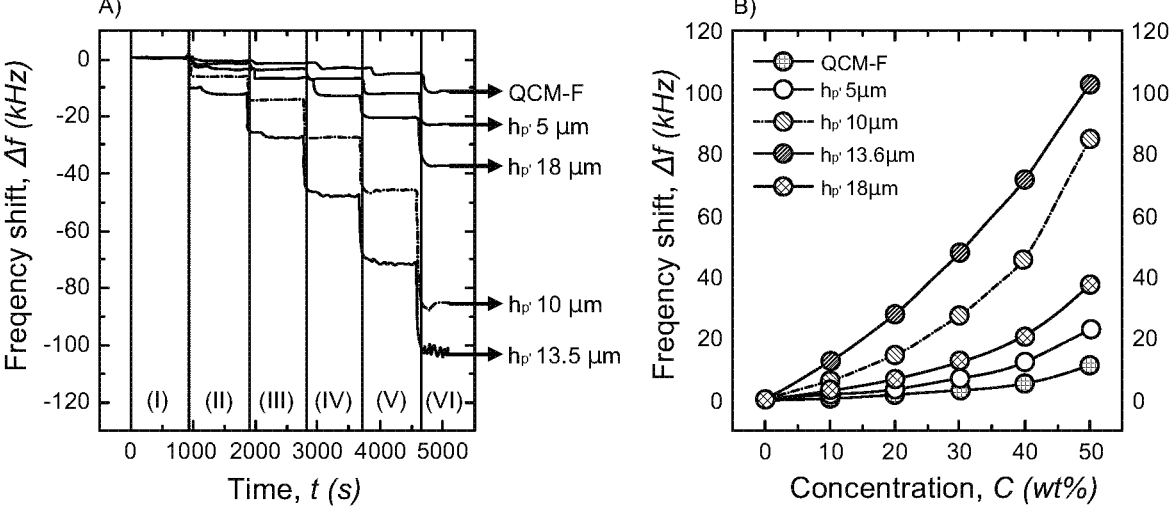
FIG. 14 are frequency responses of μPAW sensors of varying heights and fluids in accordance with the disclosed subject matter.

FIG. 14 represents the responses of μPAW sensors 1112 (micropillar heights: 5, 10, 13.6, and 18 μm) and QCM-F sensors to sucrose solutions with a concentration range of 10 to 50 wt %. The viscosity data of sucrose solutions corresponding to these concentrations are shown in Table 3. As can be seen, all the μPAW sensors 1112 show higher sensitivity toward the solution viscosity than the QCM-F. QCM-F shows a maximum frequency shift of 11 kHz at 50 wt % sucrose solution, while the frequency shifts of μPAW sensors 1112 with a micropillar height of 13.6 μm reached 102 kHz. We also noticed that the noise level of the 13.6 μm sensor is also highest for the 50 wt % sucrose solution. This is believed to be caused by the low quality factor (Q-factor) and damping of the μPAW sensor 1112 near the critical height.

TABLE 3

| The viscosity and density of sucrose solution | | |
| --- | --- | --- |
| Concentration (wt %) | Viscosity (cP) | Density (kg/m³) |
| 10 | 1.186 | 1038 |
| 20 | 1.727 | 1081 |
| 30 | 2.831 | 1127 |
| 40 | 5.474 | 1176 |
| 50 | 13.706 | 1230 |

Figure 15:
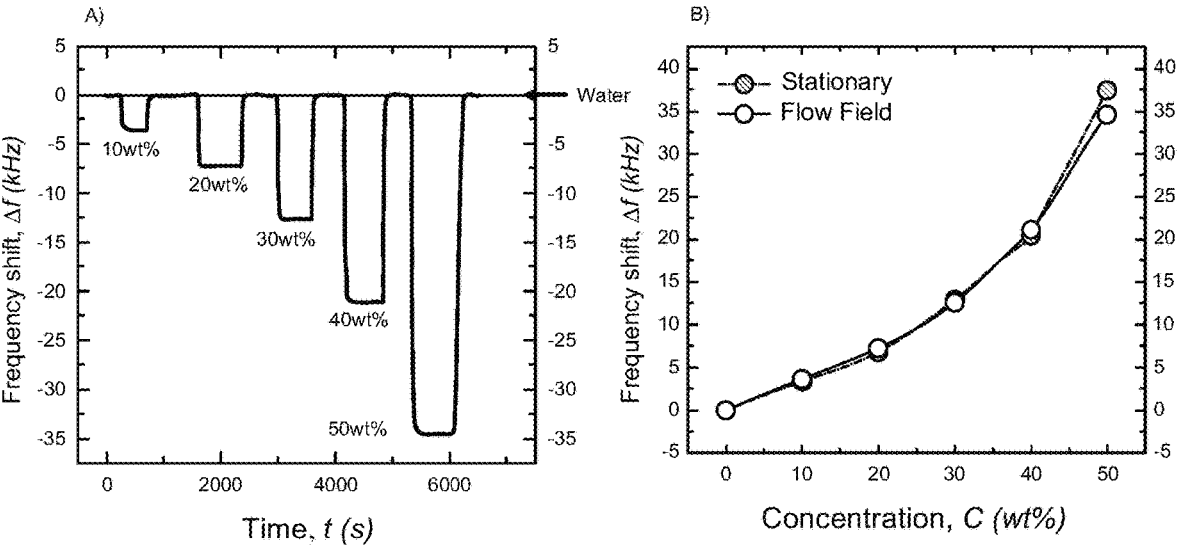
FIG. 15 are frequency responses of the μPAW (pillar height: 18 um) in the steady-state flow of sucrose solutions of various concentrations in accordance with the disclosed subject matter.

The response of μPAW sensors 1112 is prone to the effect of nonspecific physical adsorption of particles on the surface. To exclude the impact of particle attachment on the surface of μPAW sensors 1112, a control experiment based on the steady flow (100 μl/min) was conducted (FIG. 15A) for the sensor 1112 with the micropillar 104 height of 18 μm. In this experiment, DI water was injected into the flow cell to obtain the baseline. The sucrose solutions (10-50 wt %) were then flow through the sensors and the resonant frequency of μPAW sensors 1112 was recorded. At last, DI water was driven to flow over the sensor surface again. It is clear that if there exists a resonant frequency difference between the first and second DI water flows, some particles in the sucrose solutions must attach to the μPAW sensor 1112 surface. It shows that the frequency shift of the μPAW sensor 1112 returned to baseline, which indicates that the adsorption of the sucrose particles is negligible. The observed frequency shift is entirely due to the change in solution viscosity. FIG. 15B reports the comparison of the frequency shift of the μPAW (18 μm) in steady-state flow conditions with those of μPAW in a stagnant state. It is clear that the viscosity measurement of μPAW is not affected by the flow field conditions since viscosity is a property of fluid and is not dependent on the flow condition.

Figure 16:
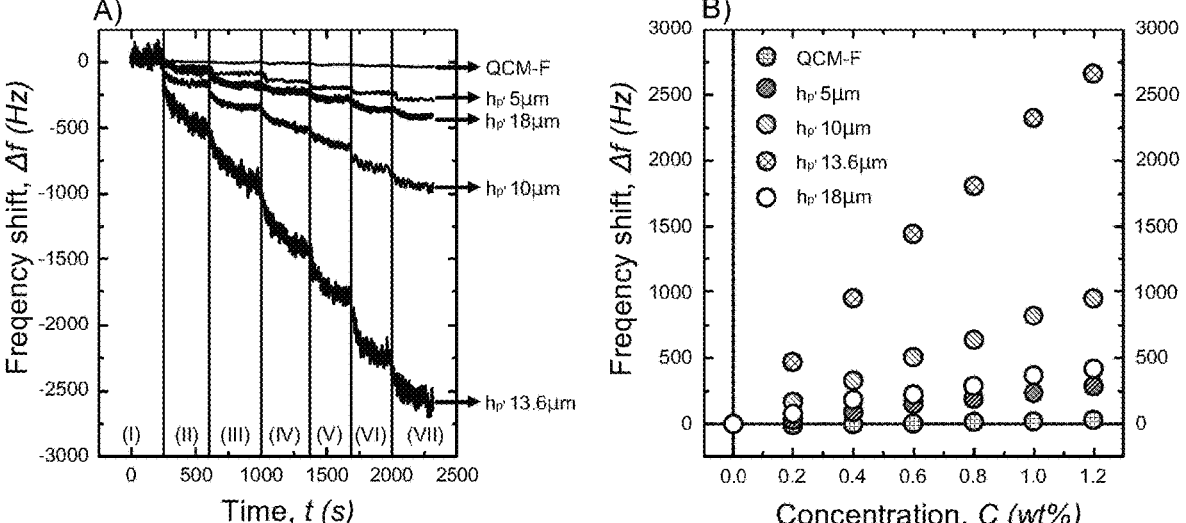
FIG. 16 are frequency responses of μPAW sensors of varying and fluids in accordance with the disclosed subject matter.

The limit of detection (LOD) is the lowest quantity a sensor can detect with a sufficient degree of significance. Two standard methods were typically employed to calculate the LOD value: 1) the first method involves the repeated measurement of the sensor's response to a blank solution and a sample solution in a concentration near the LOD value; and 2) the second method relies on the development of a linear calibration curve to the determination of LOD. This requires estimating confidence intervals and evaluating the sensor's response at various concentrations, including ones near the LOD value. A series of experiments are conducted to determine the LOD of QCM-F and μPAW in sucrose solutions with concentrations ranging from 0.2 to 1.2 wt %, and the results are shown in FIG. 16.

As can be seen, with the decrease in sucrose concentration, the frequency shift of the μPAW and QCM-F decrease accordingly. Both μPAW and QCM-F are capable of detecting viscosity variation of the solution up to 1.2 wt %. The μPAW with 13.6 μm pillar height shows a frequency shift of 2657 Hz for the 1.2 wt % sucrose concentration, compared to 32 Hz measured from QCM-F (see FIG. 14B). The μPAW is able to measure viscosity variation at sucrose concentration as low as 0.2 wt %, while there is almost no response from QCM-F for sucrose concentration below 0.6 wt %. The obtained analytical LODs based on the linear calibration curve for μPAW and QCM-F sensors are shown in Table 4. Decreasing LOD is achieved by embedding micropillars with QCM compared to QCM-F. It is obtained that the μPAW with 13.6 μm pillar height has a LOD of 0.05 wt %, compared to 1 wt % measured from QCM-F. In addition, μPAW sensors 1112 close to critical height can achieve minimum LOD compared to the μPAW sensors 1112 out of the ultra-sensitive zone.

TABLE 4

| LOD of μPAW and QCM-F sensors | |
| --- | --- |
| Sensor | LOD (wt %) |
| QCM-F | 1 |
| μPAW, $h_p$ 5 μm | 0.12 |
| μPAW, $h_p$ 10 μm | 0.073 |
| μPAW, $h_p$ 13.6 μm | 0.054 |
| μPAW, $h_p$ 18 μm | 0.1 |

Figure 17:
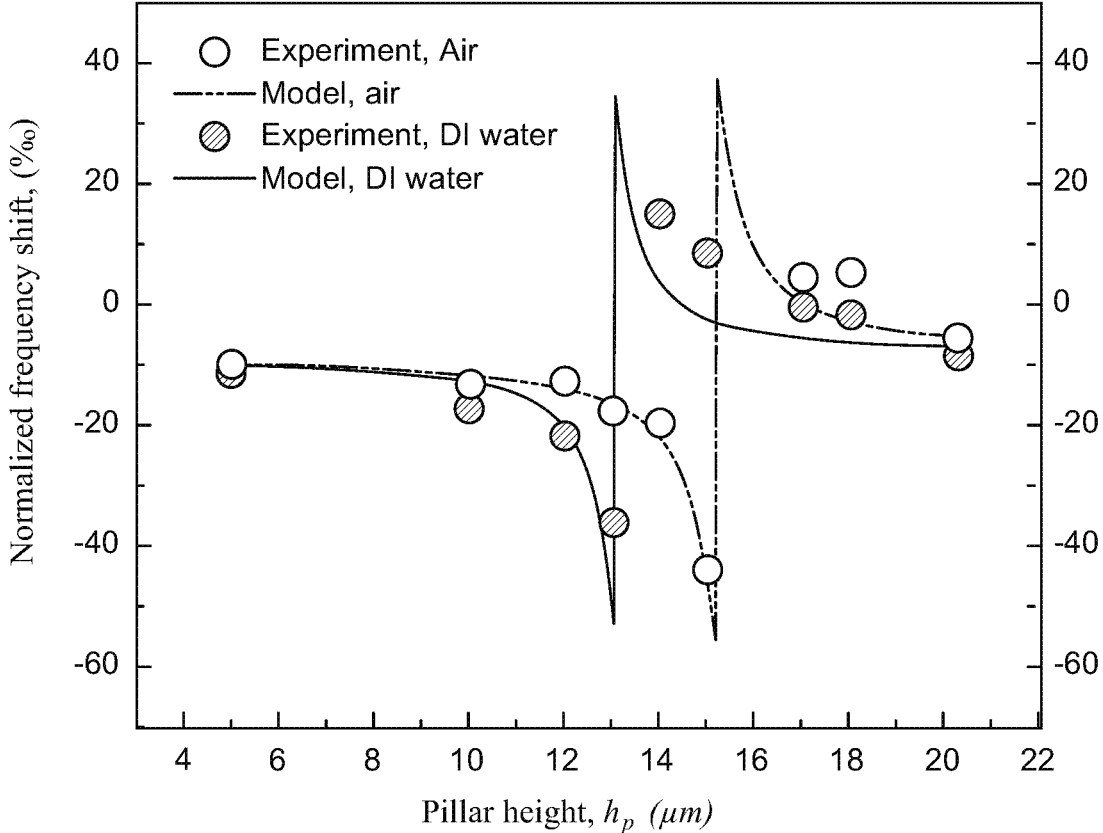
FIG. 17 is a plot of comparison of the predicted frequency shift of the μPAW operating in DI water and air with measured results in accordance with the disclosed subject matter.

The developed model in section 3 is used to predict the frequency shift of μPAW sensors 1112 in air and water (FIG. 17). Overall, the prediction results from the model agree well with the experimental results. As can be seen, the critical height of μPAW sensors 1112 becomes smaller (13 μm) when the sensors operate in water instead of air (15 μm). This is believed to be caused by the induced hydrodynamic loading and the additional mass on the micropillars 104 and QCM surface. In addition, the frequency shift of sensors shows a sudden "drop and jump" near the pillar's critical height due to the coupling of the vibrations of quartz substrate and micropillars. The analytical model successfully captures nonlinear frequency responses with the change of pillar heights.

Referring now to FIG. 18, a plot of sensitivity enhancement (frequency shift of μPAW/frequency shift of QCM-F) of μPAW devices (with micropillar heights of 5, 10, 12, 13,5, and 18 μm) over conventional QCM-F is shown. As can be seen that the μPAW devices with micropillar heights near the ultra-sensitive zone (12 and 13.5 μm) are more sensitive to the viscosity of the sucrose solutions in comparisons to those of the other micropillar heights which is away from the zone (5, 10, and 18 μm). As can be seen, the μPAW based viscosity measurement device shows a twenty-fold improvement in sensitivity over QCM-F. Also, the maximum viscosity sensitivity occurs close to the critical height, which agrees well with previous studies regarding the maximum mass sensitivity of μPAW.

A new QCM device was developed by coupling polymer micropillars with quartz crystal microbalance (QCM) substrate (μPAW) to achieve ultrahigh sensitivity for viscosity measurement studies when compared with a corresponding QCM-F. Square cross-section micropillars with micropillar heights of 5, 10, 13.6, and 18 μm were fabricated on QCM. Experimental results showed that the viscosity sensitivity of μPAW around the critical height was enhanced as much as twentyfold compared to those of traditional QCM sensors. Analyzing the LOD of μPAW and QCM-F revealed that the minimum detectable sucrose concentration using μPAW was 0.2 (wt %) compared to the traditional QCM-F, which had almost no response after solution injection from sucrose concentration below 1 (wt %). The effect of flow conditions on the viscosity measurement of the μPAW device indicated that the frequency response of μPAW is independent of the flow conditions.

Protein Absorption and Viscosity Measurement

Various injection routes have been employed to administer drugs including oral, intravenous, intramuscular, and subcutaneous. For instance, monoclonal antibody medications have been administered intravenously, which requires hospitalization or a professional healthcare worker. The subcutaneous route of administration is favored for frequent treatments and long-term regimens, which can be self-administrated by the patient, resulting in substantial cost savings for the healthcare industry. High-concentration protein composition is typically used for the subcutaneous administration of monoclonal antibody drugs as the injection volume is limited to a maximum of 1.5 mL, resulting in a high-concentration protein solution. Developing high-concentration formulations (>100 mg/ml) has presented numerous challenges, including long-term protein stability, aggregation, and solution viscosity. As protein concentration increases, the solution viscosity increases, which can pose difficulties in drug manufacture, such as pumping and filtration, and the ability to deliver the drug. The viscosity of the high-concentration protein solution can exceed the "syringeability" limit (50 cP) for subcutaneous administration in some cases.

Conventional benchtop viscometers, such as falling-body, capillary, rotational, and vibrational ones, typically require a relatively large volume of sample solution (>1 mL), limiting their applications for measuring the viscosity of high-concentration protein drug solutions as the novel proteins availability is very limited, particularly at the early stages of drug development. The viscosity of a high-concentration monoclonal antibody solution was measured by dynamic light scattering (DLS). Although the DLS method requires ten times less sample volume than the traditional viscometers, the accuracy of the system is impacted by signal interference from protein complexes.

Viscometers 100, 1100 may be configured to measure the viscosity of high-concentration protein solutions in a small sample volume (<100 μL) by taking advantage of the unique resonance phenomena of micropillars and acoustic wave substrates (μPAW) as described herein above. Polymethyl methacrylate (PMMA) micropillars similar or the same as micropillars 104 may be fabricated on quartz crystal microbalance (QCM), such as QCM 108, using thermal nanoimprinting (T-NIL) as discussed herein above. Sample solutions with different viscosities were introduced into a specially designed 4-well flow cell (1104) containing the μPAW devices. The aqueous glycerol and sucrose solutions, followed by high-concentration BSA solution as the model of protein solution were measured. The shifts in motion resistance and resonance frequency were monitored to evaluate the protein adsorption and viscosity simultaneously. A multivariable correlation was developed to demonstrate the nonlinear relationship between the density and viscosity of the fluid and the motion resistance shift of μPAW device. The main advantages of the μPAW device over other viscometers include the ability to simultaneously measure solution viscosity and protein adsorption on the surface using a simple procedure without any sample pretreatments.

In an exemplary embodiment, methods for calibrating one or more viscometers, such as viscometer 1100 may include, preparing sample solutions without any particles or proteins by mixing glycerol (such as 99% glycerol solution) with DI water to obtain glycerol solutions (aq) with concentrations ranging from c=10 to 70 V/V % corresponding viscosity from 1.3 cP to 37.2 cP. Further, preparing sucrose solutions (aq) with concentrations ranging from c=10 and 60 wt % by mixing sucrose powder with DI water to obtain viscosity ranging from 1.2 cP to 51.2 cP. The high-concentration protein solutions were modeled by the BSA solutions. First, BSA powder was dissolved in PBS buffer (pH=7.2) to get a stock solution with a concentration of 350 mg/ml. BSA solutions (aq) with concentrations ranging from c=50 mg/ml to 350 mg/ml were then prepared by diluting the stock solution to the selected concentrations. The density of the sample solutions was measured using an electronic scale (such as a, in various embodiments PM-100 resolution: 0.001 g), and the viscosity was measured using a commercial viscometer.

Referring now to FIG. 19, a flow cell 1900 with μPAW sensors 1904 were prepared by directly fabricating PMMA micropillars on a QCM substrate (10 MHz) surface using T-NIL (in various embodiments, an NX-2600). The details of the fabrication procedure can be found herein above in reference to the viscometer 1100. The micropillars may have a square cross-section with a side of 10 μm, a center-center spacing of 21 μm, and a height of 13.9 μm, similarly to viscometer 100 and 1100. In various embodiments, the micropillars may include any dimensions discussed herein. In various embodiments, the micropillars may have a round or circular cross-sectional shape. In various embodiments, micropillars may have more than one cross-sectional shape.

Figure 20A:
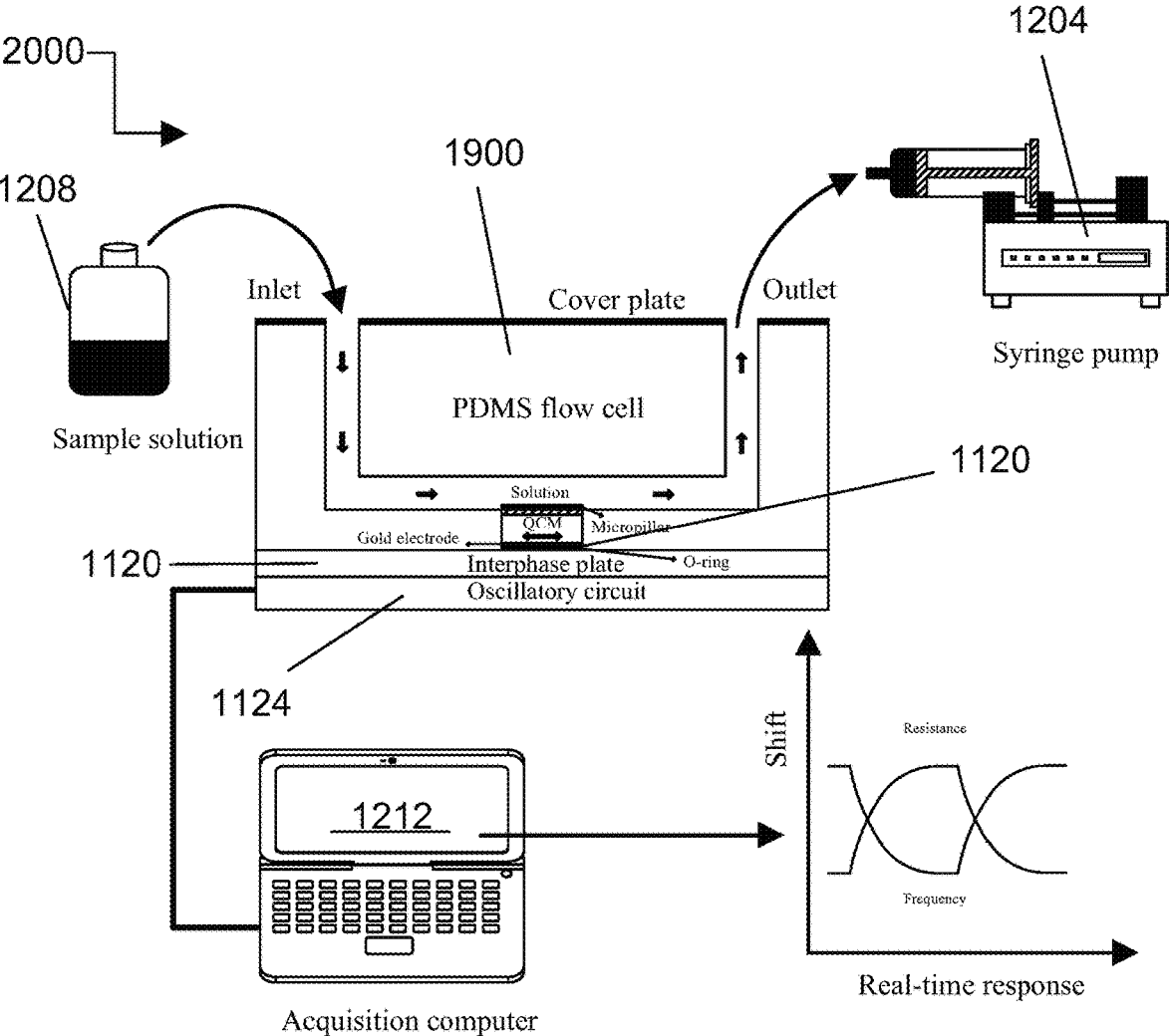
FIG. 20A is a schematic representation of a flow cell viscometer in accordance with the disclosed subject matter.

Referring now to FIGS. 20A and 20B, a viscometer 2000 is shown with the flow cell 1900 unit of the microfluidic μPAW device 1904 including four sensor wells, which are electrically connected to the Discovery-Q platform 1124 underneath. Well-known soft lithography was employed to fabricate the flow cell 1900 unit from PDMS, where the mold of the flow cell structure was designed in SolidWorks and then printed using a 3D printer, such as an Ultimaker 3, in various embodiments.

After micropillars are fabricated on the QCM substrate, the sensors 1904 are gently placed on the top of conducting O-rings 1116 in the sensor wells of the flow cell 1900. Then PDMS flow cell 1900 is pressed on top of the μPAW sensor 1904 and sandwiched between the cover plate and the oscillator circuit board of the Discovery-Q system. The electrical signal of the sensors 1904 is transmitted to the DAQ unit 1212 of the system and analyzed by the in-house software for display and analysis. The metallic cover plate is used to maintain the surface flatness of the PDMS flow cell and prevent leakage using screw-tightening.

Figure 21:
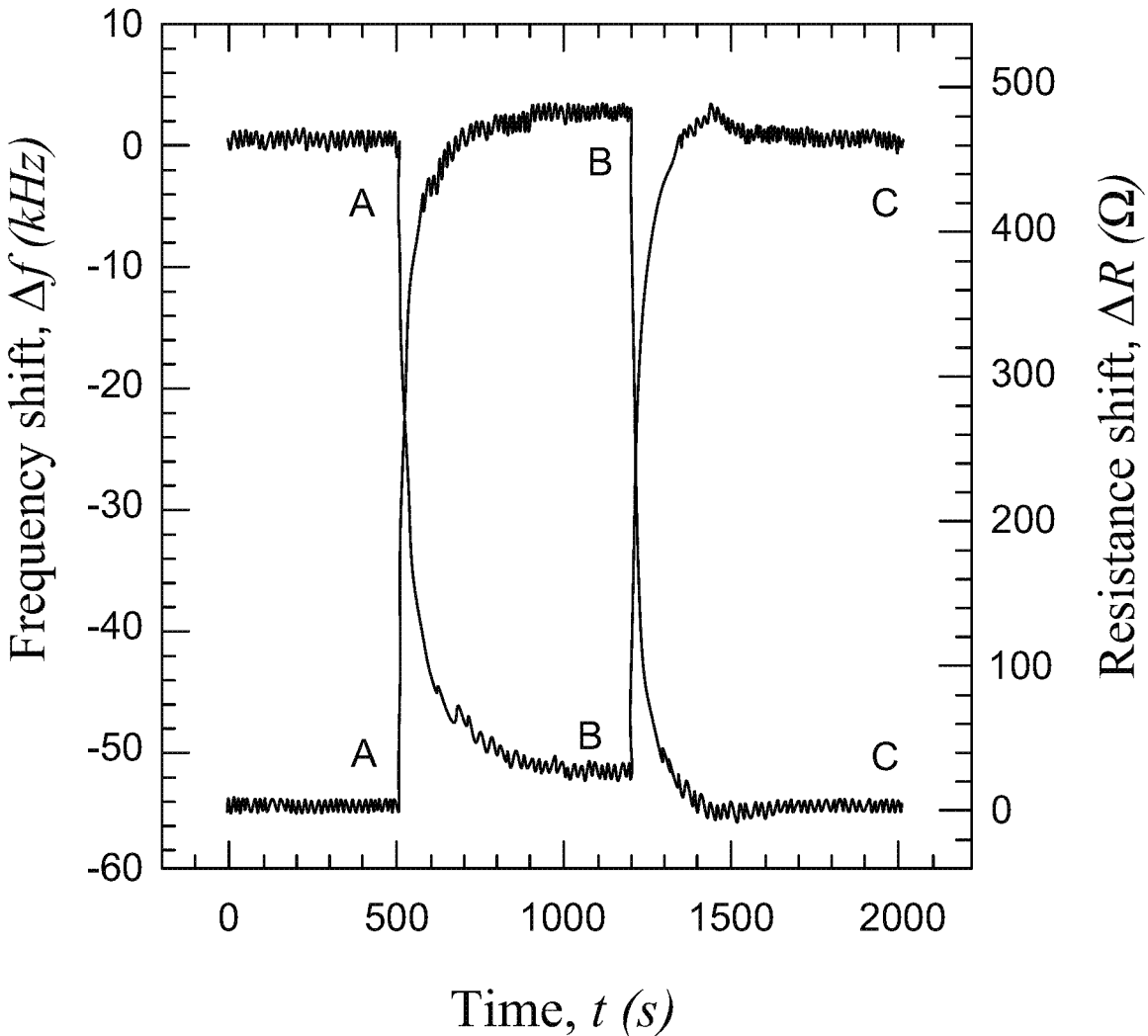
FIG. 21 are plots of frequency and resistance shifts of μPAW operating in glycerol solution in accordance with the disclosed subject matter.

FIG. 21 shows frequency and resistance shifts of the μPAW 1904 operating in glycerol solution with a concentration of 40V/V %. The flow cell was first filled with the PBS solution to establish a baseline. Sample solution was then drawn into the flow cell at a volume flow rate of Q=100 μL/min using a syringe pump installed at the outlet of the flow cell 1900. Once the chamber is filled up, the flow will be halted and the resonance frequency and motional resistance are recorded to evaluate the protein adsorption and viscosity change in comparison to the baseline. Once the QCM signal reached stable, the baseline solution was flown into the chamber to wash away any loosely bound proteins and establish the second baseline (see FIG. 3).

The traditional QCM measurement is affected by both the variation of solution properties, such as viscosity, and the attached mass on the substrate. Viscometers 100, 1100 and 2000, which include μPAW devices 1904 concurrently monitor the resonance frequency and motional resistance to distinguish the viscosity effect from the mass adsorption effect on the surface. To evaluate the viscosity of a solution with μPAW devices 1904, a calibration correlation was generated using glycerol and sucrose solutions. The glycerol solutions concentrations range from c=0 (DI water) to 70 V/V % and sucrose solutions from c=10 to 60 wt %. The viscosity and density of sample solutions corresponding to these concentrations can be found in the supplementary materials. FIG. 21 shows the frequency and motion resistance responses of μPAW to glycerol solution (aq) at a concentration of 40 V/V % as a function of time. As can be seen, the baseline (Δf=0, ΔR=0) was reached first by flowing DI water. When the glycerol solution was introduced into the flow cell chamber (at A), the frequency decreased rapidly while the resistance increased quickly in response to the changes in solution properties. When the frequency and resistance signals reached stable, DI water was flown again (at B), and the signals returned back to the levels of the first baseline, confirming that the frequency and resistance shifts in A-B and B-C are entirely due to the changes in the solution properties.

Figure 22:
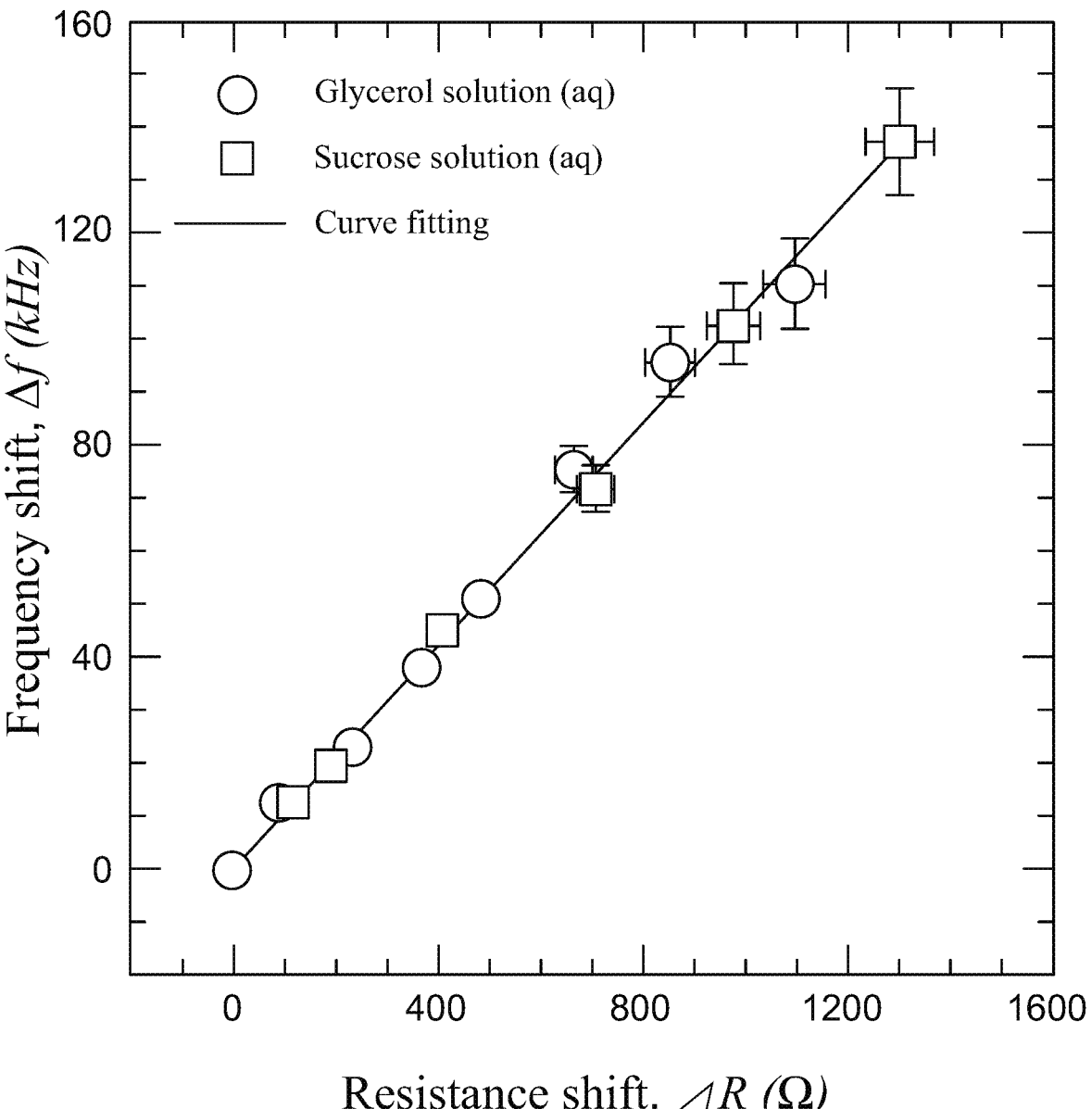
FIG. 22 is a plot of frequency shifts and resistance shift of a μPAW operating in a glycerol solution in accordance with the disclosed subject matter.

FIG. 22 presents the frequency shift (Δf) vs. resistance shift (ΔR) of the μPAW 1904 operated in glycerol and sucrose solutions. Clearly, there is a linear relationship existing between frequency and resistance shifts which can be given by $$\Delta f \text{ (kHz)} = 0.106 \times \Delta R \qquad (2)$$

Kanazawa et al. reported that the resistance shift of a conventional QCM is linearly proportional to the square root of the product of the density and viscosity of the solution. However, this relationship becomes invalid for the μPAW devices 1904 due to the different working mechanisms where μPAW devices 1904 rely on the resonance of micropillars and acoustic wave substrate while the QCM depends on the resonance of acoustic wave substrate itself. Therefore, a phenomenological correlation was developed to predict the relationship between the resistance shift and the viscosity and density of the solution based on the measurements for glycerol and sucrose solutions and given by:

$$\Delta R = 8.38\rho^{0.26}\eta^{0.02} - 8.37$$

Where $\rho$ is the density (g/mL) and $\eta$ is the viscosity (cP) of the solution. Furthermore, the prediction of the correlation was compared with those of the commercial viscometer and the results are shown in FIG. 23.

Figure 24:
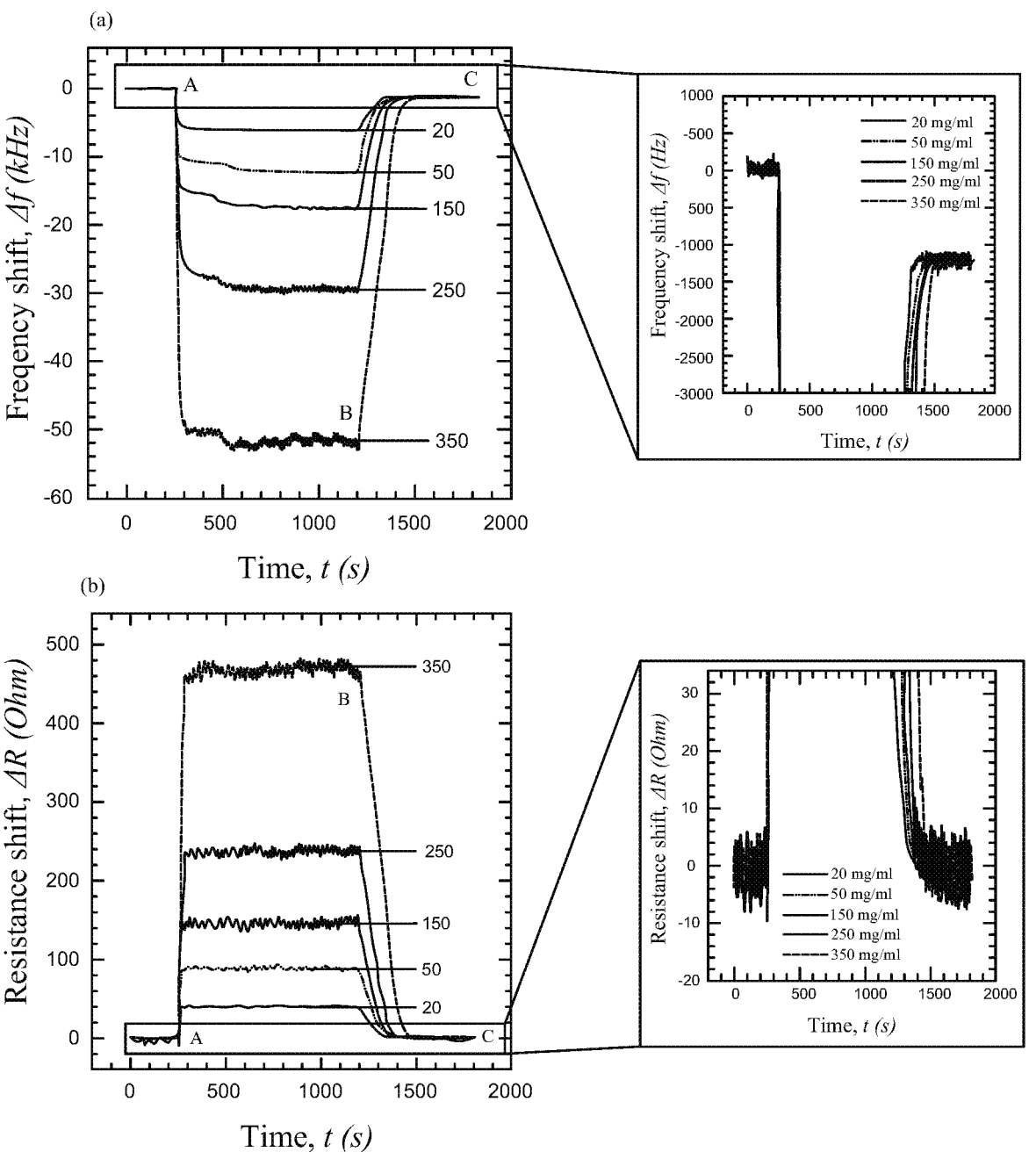
FIG. 24 is real-time frequency and resistance shifts of μPAW operating in BSA solution of varying concentrations in accordance with the disclosed subject matter.

Referring now to FIG. 24, a real-time frequency (a) and resistance shifts (b) of μPAW operating in BSA solution of concentrations ranging from c=50 to 359 mg/ml is shown. FIG. 24 shows the frequency and resistance shifts of the μPAW 1904 for the BSA solution with concentrations ranging from 50 mg/ml to 350 mg/ml (viscosity from 1.3 cP to 8.2 cP) following the same procedure previously described for glycerol and sucrose solutions. First, the baseline solution ($\Delta f=0$, $\Delta R=0$) (DI water) was introduced. At t~250 seconds (point A), protein-rich BSA liquid was drawn into the chamber. After ~950 seconds, the response of μPAW 1904 reached a steady state at point B. Theoretically, some BSA proteins may be firmly adsorbed to the substrate while others are not. Therefore, DI water was flown again to wash off the loosely bonded proteins and a second baseline was established. It can be seen that a much larger frequency and resistance shifts appear in higher concentration BSA solutions indicating the effects of the higher viscosity and density of the solutions.

More importantly, the frequency shifts of the second baseline were lower than those measured in the first baseline. This is a strong indication that BSA proteins were firmly bonded to the PMMA surface. However, a different trend was observed for the resistance shift. The resistance shift returned to the same values obtained in the first baseline. The hypothesis here is that the resistance shift only responds to the changes in solution property but not BSA adhesion. In the meantime, the frequency shift can be utilized to quantify the adhered BSA proteins to the substrate.

Figure 25:
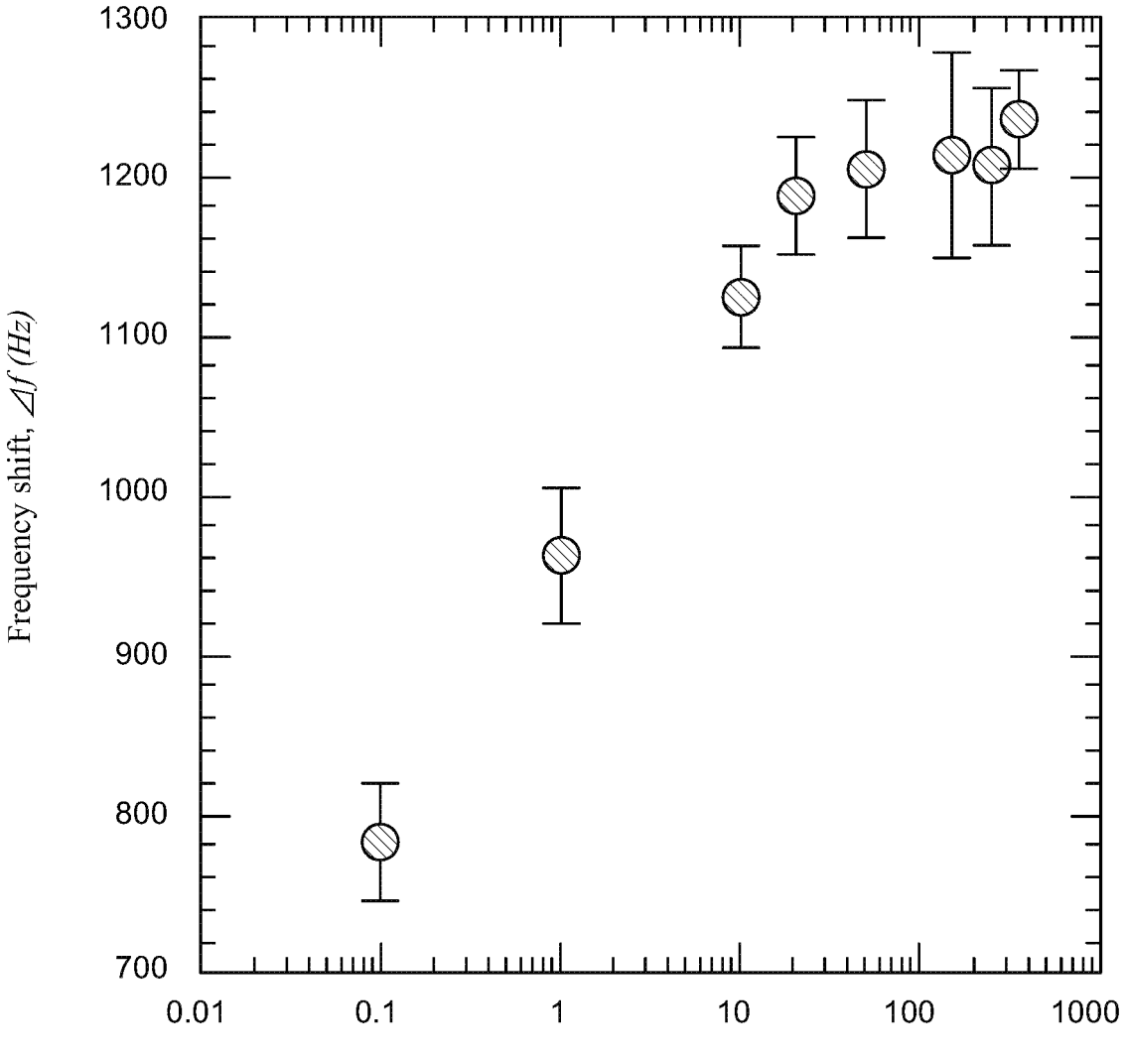
FIG. 25 is a plot of frequency shift versus concentration of a μPAW to absorbed BSA proteins on a PMMA surface in accordance with the disclosed subject matter.

As a result, FIG. 25 presents the frequency shifts of μPAW 1904 due to the adhered BSA proteins on the substrate as a function of BSA concentration. It should be pointed out that the attached protein film can be approximated as a rigid Sauerbrey film as the resistance shift between A-C is less than 5Ω. In addition, the frequency shifts due to the absorbed BSA proteins on the substrate becomes a constant (~1200 Hz) after the BSA concentrations reach 20 mg/ml, indicating that maximum adsorption capacity has been reached. These results are consistent with the previous studies regarding the adsorption of BSA on the PMMA substrates.

Figure 26:
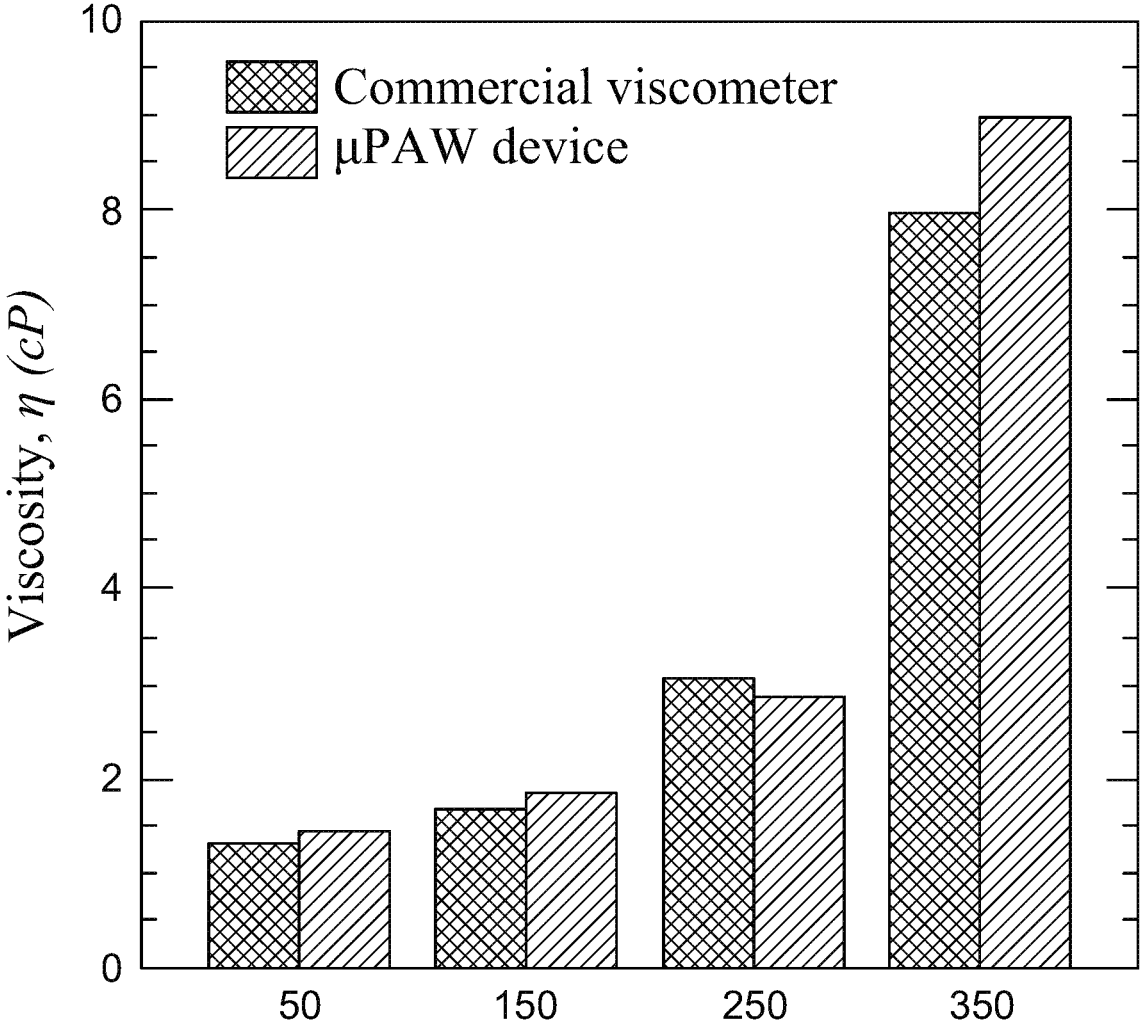
FIG. 26 is a plot of a comparison of viscosity quantified by the μPAW device and a commercial viscometer in accordance with the disclosed subject matter.

A comparison of the viscosity measurement from μPAW devices 1904 with those of a commercial viscometer is presented in FIG. 26. It should be pointed out that the viscosity of high-concentration BSA solutions was calculated using calibration correlation. As can be seen, a good agreement is obtained between measured viscosity and actual values with a maximum error of 12% which is higher than that of the commercial viscometer which is around 5%. This is due to the high damping induced by the hydrodynamic loading on the vibrating micropillars when μPAW 1904 operates in the Wenzel state (micropillars are entirely immersed in the liquid solution). It is believed that the performance of μPAW 1904 can be significantly improved when it operates in Cassie state where the solution only contact the tops of the micropillars when micropillars are hydrophobic. In addition, the nonlinear regression technique which was used to correlate the response of μPAW 1904 with viscosity may result in a high error. Other techniques, such as deep neural networks and physics-informed neural networks are undergoing to reduce the errors.

A novel, portable micropillar-enhanced acoustic wave device (μPAW) was studied to simultaneously evaluate the protein absorption and viscosity of high-concentration protein solutions for the potential applications in protein therapeutics drug development. The working principle of the μPAW method is based on concurrent measurements of the resistance and frequency shifts from the baseline solution to the protein solutions. A correlation was obtained to correlate the resistance response of the μPAW device to the viscosity of the high-concentration BSA solutions (50-350 mg/ml) and the comparison with the actual viscosity values was presented. Furthermore, the μPAW is capable of measuring the protein adsorption on the substrate alongside the viscosity of the BSA solution, which is very promising for protein therapeutics drug industry, where a simultaneous measurement of target biological proteins and viscosity measurement is required.

While the disclosed subject matter is described herein in terms of certain preferred embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

What is claimed is:

1. A micropillar-enabled acoustic wave viscometer, comprising:
   a quartz crystal microbalance (QCM) substrate;
   a plurality of micropillars, each micropillar having a first end and a second end, defining a height therebetween, wherein each micropillar is disposed on the QCM substrate at the first end and extending perpendicular to the QCM substrate; and
   a film disposed between the plurality of micropillars and the QCM substrate;

wherein the plurality of micropillars and regions between adjacent micropillars define a partial-wetting interface that retains air between adjacent micropillars, thereby enabling detection of resonance-frequency and motional-resistance shifts corresponding to viscosity of a liquid contacting the interface.

2. The viscometer of claim 1, wherein the plurality of micropillars comprises polymethyl methacrylate (PMMA).

3. The viscometer of claim 1, wherein a drop of fluid is suspended on a top face of at least one micropillar of the plurality of micropillars.

4. The viscometer of claim 1, wherein a drop of fluid is suspended on the QCM substrate, fully enveloping at least one micropillar of the plurality of micropillars.

5. The viscometer of claim 1, wherein the plurality of micropillars are disposed in a grid pattern on the QCM substrate.

6. The viscometer of claim 5, wherein a center-to-center distance of two adjacent micropillars of the plurality of micropillars is 21 micrometers.

7. The viscometer of claim 1, wherein the height of at least one micropillar is 5 to 18 micrometers.

8. The viscometer of claim 1, wherein at least one micropillar has a approximately square cross-section.

9. The viscometer of claim 8, wherein a side length of the square cross-section is 10 micrometers.

* * * * *